(12) United States Patent
Mizukawa

(10) Patent No.: US 7,401,539 B2
(45) Date of Patent: Jul. 22, 2008

(54) BLADE MATERIAL CUTTING DEVICE

(76) Inventor: Suehiro Mizukawa, 4-25, Torikainishi 5-chome, Settsu-shi, Osaka (JP) 566-0072

( * ) Notice: Subject to any disclaimer, the term of this patent is extended or adjusted under 35 U.S.C. 154(b) by 0 days.

(21) Appl. No.: 11/430,242

(22) Filed: May 9, 2006

(65) Prior Publication Data

US 2006/0201304 A1 Sep. 14, 2006

Related U.S. Application Data

(62) Division of application No. 09/926,384, filed as application No. PCT/JP00/01182 on Mar. 1, 2000, now Pat. No. 7,231,860.

(51) Int. Cl.
*B26D 1/00* (2006.01)
*B21D 43/28* (2006.01)

(52) U.S. Cl. .............................. 83/569; 83/581; 83/598; 83/620; 83/694; 72/294

(58) Field of Classification Search .................. 83/549, 83/599, 569, 578, 581, 622, 692, 694, 695, 83/916, 917, 51, 598, 618, 620; 72/294, 72/324, 326, 332
See application file for complete search history.

(56) References Cited

U.S. PATENT DOCUMENTS

| 516,736 | A | 3/1894 | Hammond |
| 1,374,278 | A | 4/1921 | Burch |
| 3,134,285 | A | 5/1964 | Greene |
| 4,233,871 | A | 11/1980 | Alessi |
| 4,421,591 | A | 12/1983 | DeLigt |
| 4,951,540 | A | 8/1990 | Cross |
| 5,461,893 | A | 10/1995 | Tyler |
| 6,227,026 | B1 | 5/2001 | Mizukawa |
| 6,487,887 | B2 | 12/2002 | Yamada |
| 7,231,860 | B1 * | 6/2007 | Mizukawa ................... 83/569 |

FOREIGN PATENT DOCUMENTS

| GB | 1 322 515 | 9/1970 |
| JP | 2-8655 | 3/1990 |
| JP | 2218509 | 8/1990 |
| JP | 6-80516 | 11/1994 |
| JP | 8-300215 | 11/1996 |
| JP | 8-510961 | 11/1996 |
| JP | 11-347827 | 12/1999 |

* cited by examiner

*Primary Examiner*—Jason Prone
(74) *Attorney, Agent, or Firm*—Bacon & Thomas, PLLC

(57) ABSTRACT

A blade material cutting device for producing a blade material used as a punching blade. Included are: a stationary blade part having a pair of front and rear support faces on which a strip plate part and a blade edge part of the blade material are to be overlaid, and which are separated from each other by a gap in a feeding direction of the blade material; a pair of opposed front and rear stationary edges which are disposed in the pair of support faces; a movable blade part which moves into and out of the mutual gap between the pair of support faces; and a pair of front and rear movable edges which are disposed in the movable blade part. When the blade material is overlaid on the support faces and the movable blade part is moved, a disposal portion of the blade material is cut away, and the shapes of the front and rear ends of the blade material are not bent but are maintained in their original shape.

2 Claims, 41 Drawing Sheets

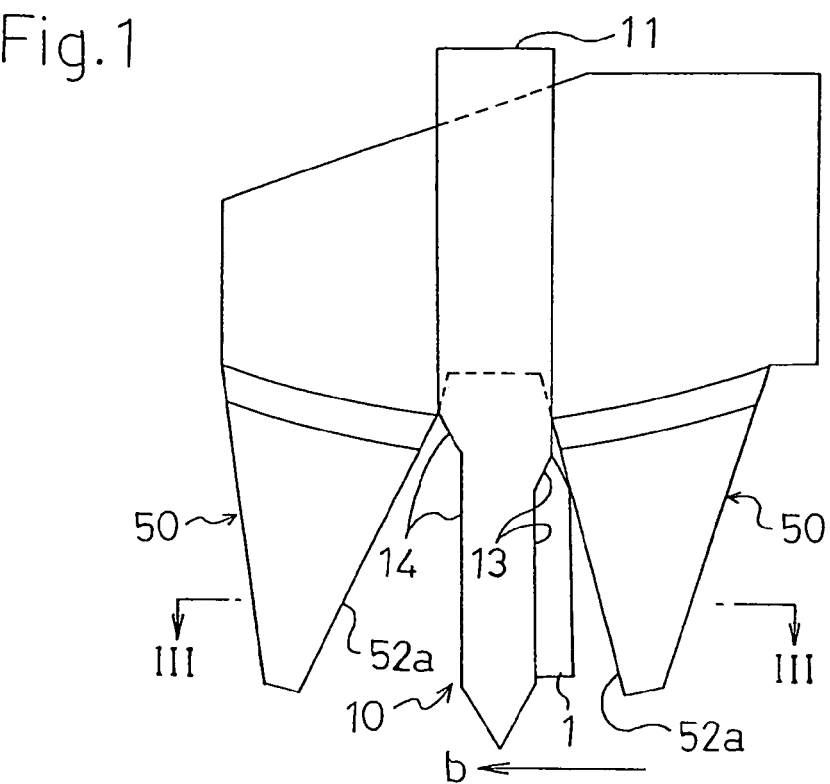
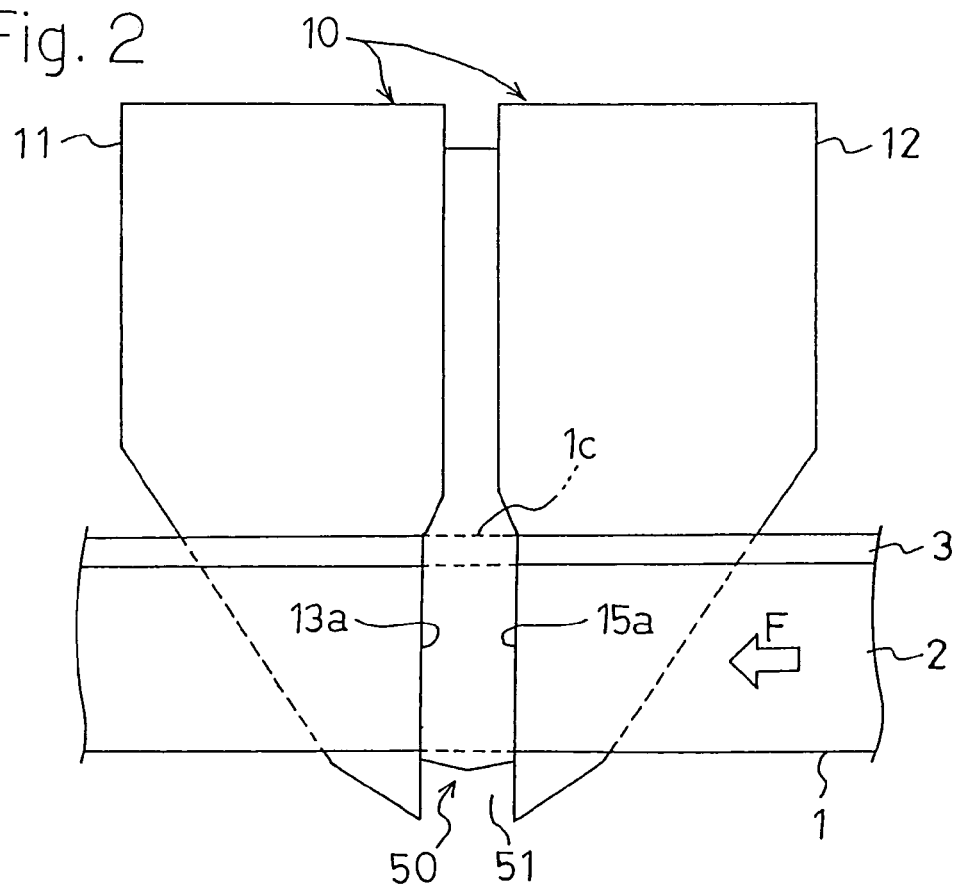

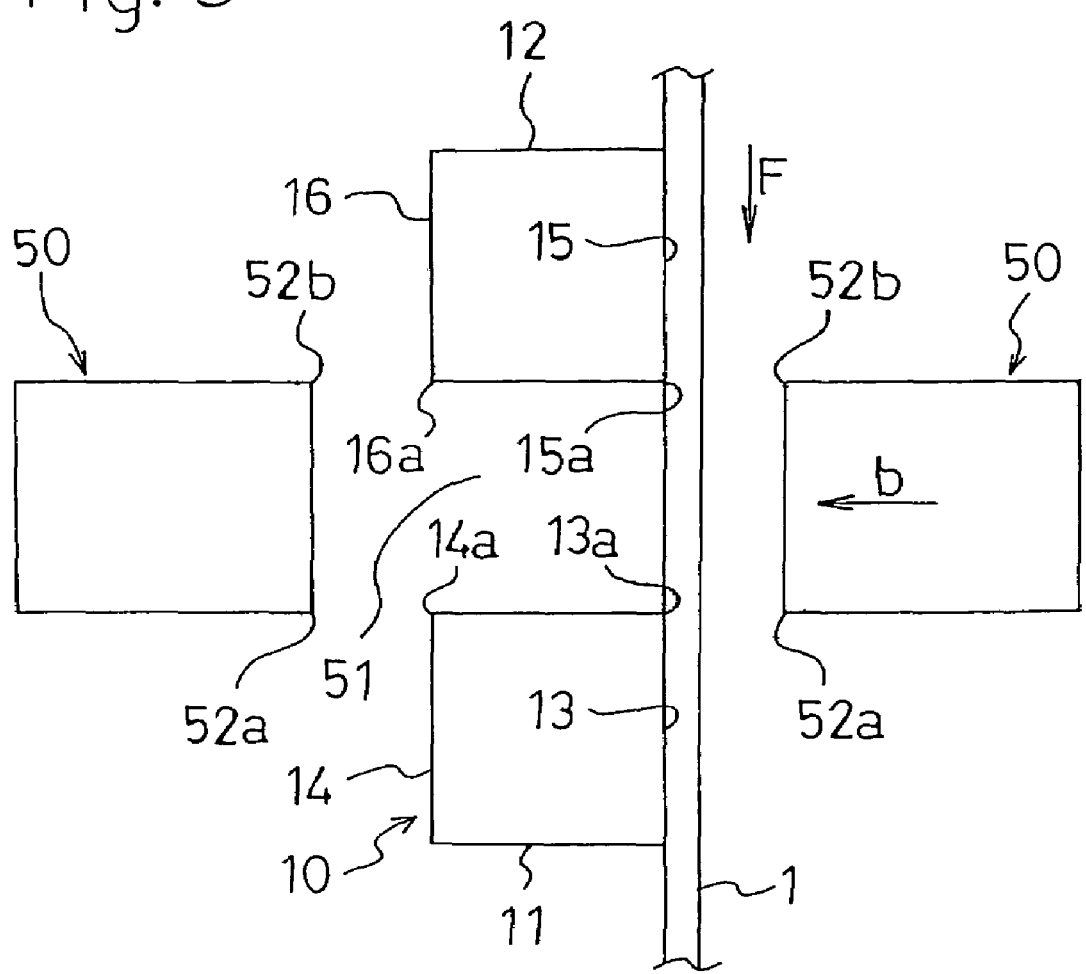

1   1b

1b

1c

1c 1a   1

1a

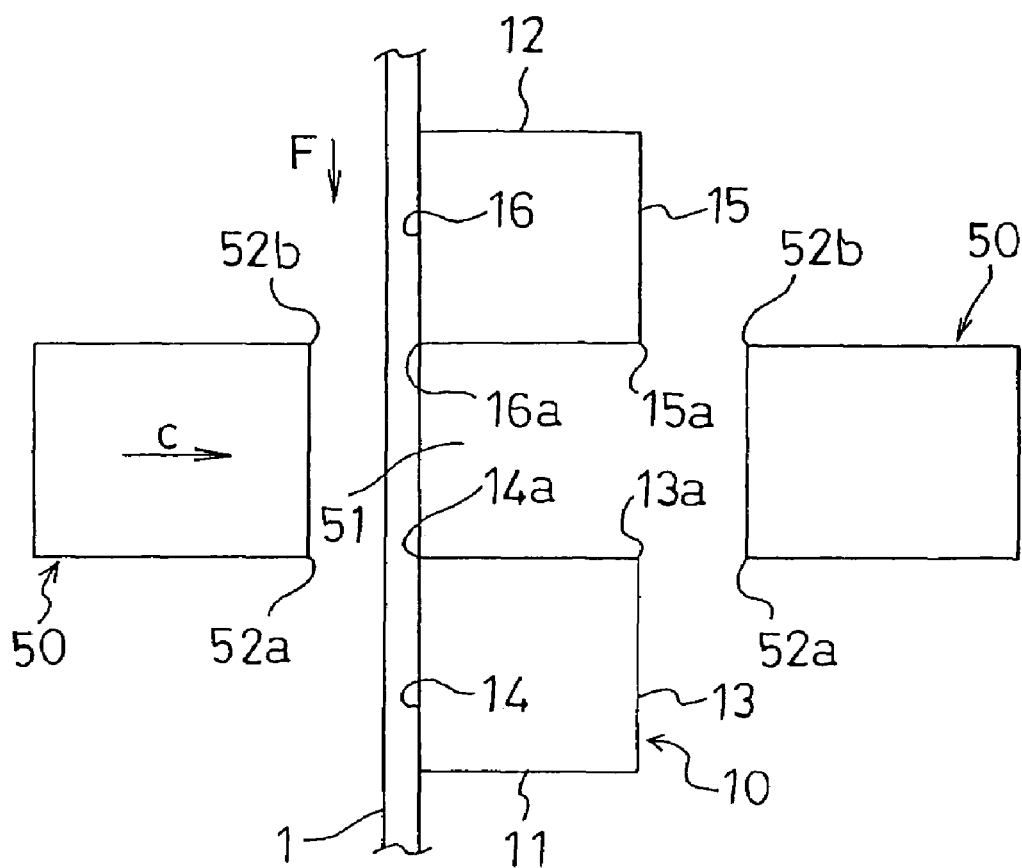

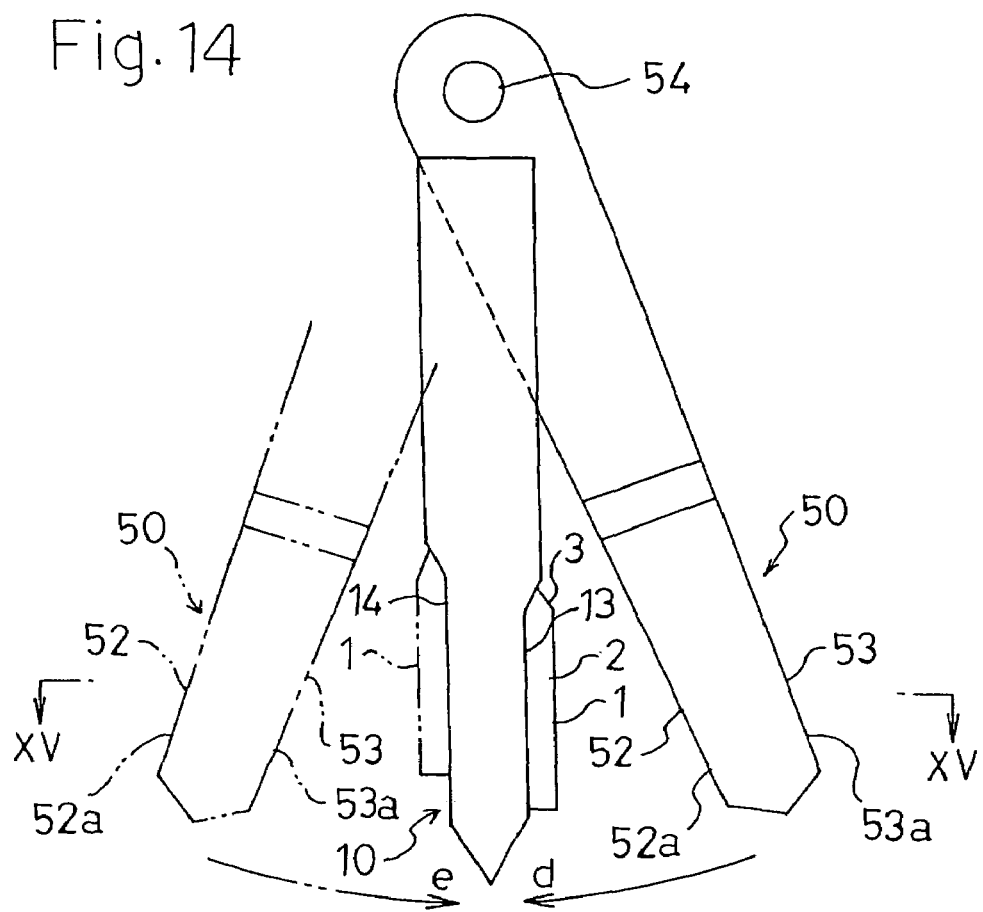
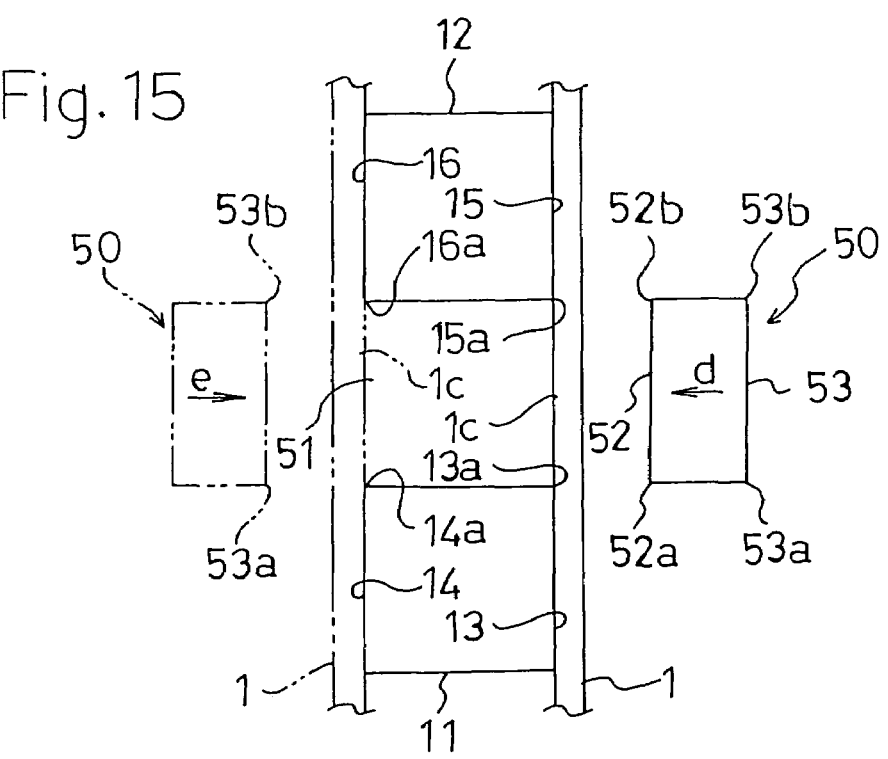

Fig. 57A (PRIOR ART)
Fig. 57B (PRIOR ART)
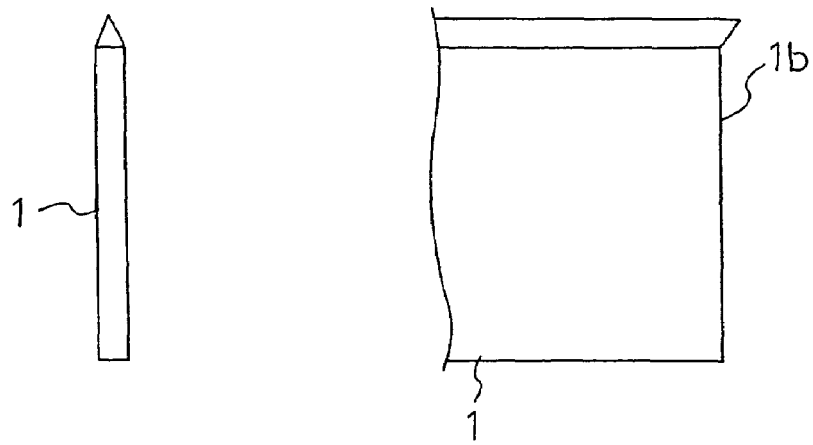
Fig. 57C (PRIOR ART)
Fig. 57D (PRIOR ART)
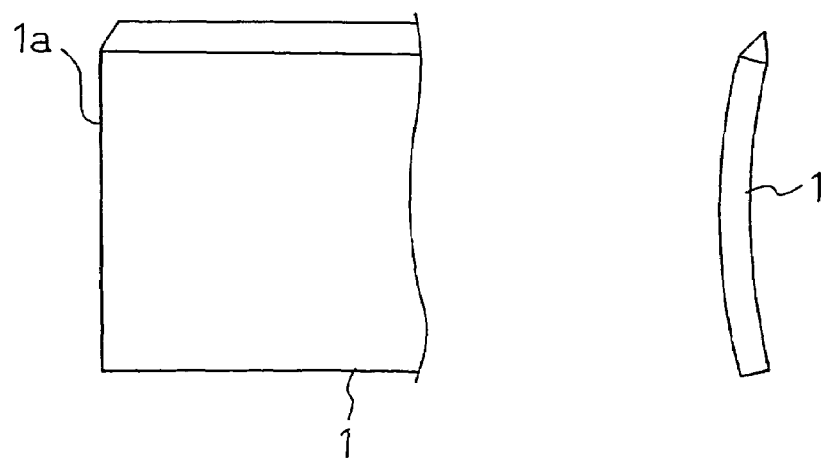

BLADE MATERIAL CUTTING DEVICE

This is a divisional of Ser. No. 09/926,384 filed on Oct. 23, 2001 now U.S. Pat. No. 7,231,860 which is a U.S. National Stage of PCT/JP00/01182 filed on Mar. 1, 2000.

TECHNICAL FIELD

The present invention relates to a blade material cutting device which is employed for cutting a strip blade material that is to be used as a punching blade (Thomson blade: Steel rule knife).

BACKGROUND ART

As shown in FIGS. 44 and 45, in a strip blade material 1 that is to be used as a punching blade, a blade edge part 3 is formed in an edge in one side in the width direction of a strip plate part 2. After being subjected to a necessary bending work or the like, the blade material 1 is used in an application such as formation of a notch line or a fold line in a piece of paper, a sheet, a plate, or the like. In the blade material 1, end parts in the longitudinal direction are straight-cut as shown in FIG. 44, or miter-cut as shown in FIG. 45. As seen from FIG. 44, the straight-cut work is a work of linearly cutting end parts of the blade material 1 over the blade edge part 3 and the strip plate part 2. As seen from FIG. 45, the miter-cut work is a work of cutting end parts of the blade edge part 3 in the end parts of the blade material 1 into a shape which is obliquely inclined with respect to end parts of the strip plate part 2, and is conducted, for example, in order to prevent a gap from being formed in the blade edge portion when blade materials are joined to each other. In FIG. 45, miter parts of the blade edge are indicated by a reference numeral 3a.

FIGS. 46 and 47 show the principle of a blade material cutting device which is conventionally known. The blade material cutting device comprises: a stationary blade part 5 having a slit 4 into which the blade material 1 is to be fed; and a movable blade part 6 which is laterally movable in front of the slit 4.

In the blade material cutting device, when the blade material 1 which has been fed as indicted by the arrow F in FIG. 47 is passed through the slit 4 of FIG. 46 and the feeding operation is stopped, for example, the movable blade part 6 is swung about a fulcrum f as indicated by the arrow a of FIG. 46. Then, a stationary edge 5a of the stationary blade part 5 and a movable edge 6a (see FIG. 48) of the movable blade part 6 cooperate with each other to cut the blade material 1. In this case, as shown in FIG. 47, the portion of the blade material 1 where the blade material 1 is overlaid on the stationary blade part 5 is supported by the stationary blade part 5, and by contrast the portion which is pressed by the movable blade part 6 is deformed in a side direction of the stationary edge 5a. After the cutting, in the portion pressed by the movable blade part 6, therefore, the shape of the cut surface of the blade material 1 which is illustratively shown in FIG. 50A is bent as shown in FIG. 50B. By contrast, in the portion supported by the stationary blade part 5, the shape of the cut surface of the blade material 1 shown in FIG. 50D is not deformed but is maintained to the original adequate shape as shown in FIG. 50C. When, in a portion where the operation of feeding the long blade material 1 is stopped, a predetermined portion of the blade material 1 is cut by using the blade material cutting device shown in FIGS. 46 and 47, therefore, the cut surface shape of the front end 1a of the blade material 1 which is produced as a result of the cutting is not deformed but is maintained to the original adequate shape as shown in FIG. 51, but that of the rear end 1b of the blade material 1 which is produced as a result of the cutting is bent. Also a portion W in the vicinity of the rear end 1b is similarly bent.

When the blade material 1 is to be cut, the strip plate part 2 and the blade edge part 3 of the blade material 1 must be overlaid on a support face 7 formed in the stationary blade part 5 as shown in FIG. 49. When the blade edge part 3 is not overlaid on the support face 7, particularly, the blade edge part 3 is bent.

When the straight-cut work shown in FIG. 44 or the miter-cut work shown in FIG. 45 is requested to be conducted, edges of the stationary blade part and the movable blade part must be formed into a shape which enables such a work.

FIGS. 52, 53, 55, and 56 show a blade material cutting device which can conduct the above-mentioned two kinds of cut works.

In the blade material cutting device, support faces 7a, 7b are formed respectively in right and left side faces of the stationary blade part 5, a stationary edge of the support face 7a on one side serves as a straight-cutting edge, and that of the support face 7b on the other side serves as a miter-cutting edge.

In the blade material cutting device, when the stationary edge for straight-cutting and a movable edge of a movable blade part 6 cooperate with each other to cut two or front and rear portions of the blade material 1 as shown in FIGS. 52 and 53, the front end 1a of the blade material 1 which is produced as a result of the cutting is not deformed but is maintained to the original adequate shape as shown in FIGS. 54A and 54B, but the rear end 1b of the blade material 1 which is produced as a result of the cutting is bent as shown in FIGS. 54C and 54D. In the blade material cutting device, also when the stationary edge for miter-cutting and the movable edge of the movable blade part 6 cooperate with each other to cut two or front and rear portions of the blade material 1 as shown in FIGS. 55 and 56, the front end 1a of the blade material 1 which is produced as a result of the cutting is not deformed but is maintained to the original adequate shape as shown in FIGS. 57A and 57B, but the rear end 1b of the blade material 1 which is produced as a result of the cutting is bent as shown in FIGS. 57C and 57D.

FIGS. 58 to 61 show another blade material cutting device which can conduct the above-mentioned two kinds of cut works.

In the blade material cutting device, the stationary blade part 5 is formed into a fork-like shape having a pair of right and left protrusions 8, 9. The above-mentioned support faces 7a, 7b are formed respectively in opposed left and right side faces of the pair of protrusions 8, 9, a stationary edge of the support face 7a on one side serves as a straight-cutting edge, and that of the support face 7b on the other side serves as a miter-cutting edge.

In the blade material cutting device, when the stationary edge for straight-cutting and a movable edge of the movable blade part 6 cooperate with each other to cut two or front and rear portions of the blade material 1 as shown in FIGS. 58 and 59, the front end 1a of the blade material 1 which is produced as a result of the cutting is not deformed but is maintained to the original adequate shape in the same manner as described with reference to FIGS. 57A and 57B, but the rear end 1b of the blade material 1 which is produced as a result of the cutting is bent in the same manner as described with reference to FIGS. 57C and 57D. In the blade material cutting device, also when the stationary edge for miter-cutting and the movable edge of the movable blade part 6 cooperate with each other to cut two or front and rear portions of the blade material 1 as shown in FIGS. 60 and 61, the front end 1a of the blade material 1 which is produced as a result of the cutting is not deformed but is maintained to the original adequate shape, but the rear end 1b of the blade material 1 which is produced as a result of the cutting is bent.

FIGS. 60 and 61 which have been described above show an example in which the blade material 1 is cut into a miter shape wherein an end part of the blade edge part 3 after the cutting is inclined in a direction along which the end part does not protrude from the strip plate part 2. In contrast, FIGS. 62 and 63 show an example in which the blade material 1 is cut into a miter shape wherein an end part of the blade edge part 3 after the cutting is inclined in a direction along which the end part protrudes from the strip plate part 2.

In the above-described blade material cutting devices, in the same manner as the conventional blade material cutting device which has been described with reference to FIGS. 46 and 47, there is a problem in that the front end 1a of the blade material 1 which is produced as a result of the cutting is maintained to the original adequate shape, but the rear end 1b of the blade material 1 which is produced as a result of the cutting is bent.

DISCLOSURE OF INVENTION

The invention has been conducted in view of the above-discussed problem.

It is an object of the invention to, when a predetermined portion of a long blade material is cut in a portion where the operation of feeding the blade material is stopped, prevent the cut surface shapes of both the front and rear ends of the blade material which are produced as a result of the cutting, from being deformed, or maintain the cut surface shapes to the original adequate shape.

It is another object of the invention to, even when the straight-cut work or the miter-cut work is conducted, prevent the cut surface shapes of both the front and rear ends of the blade material which are produced as a result of the cutting, from being deformed, or maintain the cut surface shapes to the original adequate shape.

It is a further object of the invention to enable both the front and rear ends of a blade material to be cut simply by conducting a single operation of cutting the blade material, and prevent the cut surface shapes of both the front and rear ends from being bent, or maintain the cut surface shape to the original adequate shape.

The blade material cutting device of the invention is employed for cutting a blade material in which a blade edge part is formed in an edge of a strip plate part.

The blade material cutting device of the invention has: a stationary blade part having a pair of front and rear support faces on which the strip plate part and the blade edge part of the blade material are to be overlaid, and which are placed with being separated from each other by a gap in a direction of feeding the blade material; a pair of opposed front and rear stationary edges which are disposed in the pair of support faces; a movable blade part which is extracted and retracted with respect to the mutual gap between the pair of support faces; and a pair of front and rear movable edges which are disposed in the movable blade part, and which cooperate with the pair of stationary edges to cut away a disposal portion of the blade material that is positioned between the stationary edges.

In the invention, when, after the strip plate part and the blade edge part of the blade material are overlaid on the pair of front and rear support faces of the stationary blade part, the movable blade part is advanced from the outside of the mutual gap between the support faces toward the inside, the pair of front and rear stationary edges on the side of the support faces and the pair of front and rear movable edges of the movable blade part cooperate to allow two or front and rear portions of the blade material to be cut simply by conducting a single cutting operation, and to cut away a disposal portion of the blade material between the front and rear stationary edges. In this case, the blade material which is overlaid on the front support face is cut while the blade material is kept to be supported by the support face, and hence the cut surface shape of the rear end of the blade material is not bent but is maintained to the original adequate shape. Similarly, also the blade material which is overlaid on the rear support face is cut while the blade material is kept to be supported by the support face, and hence the cut surface shape of the front end of the blade material is not bent but is maintained to the original adequate shape.

This function is exerted similarly even when each of the stationary edges and the movable edges is either of a straight-cutting edge for linearly forming a cut line which extends over the blade edge part and the strip plate part of the blade material after the cutting, or a miter-cutting edge for conducting a cutting operation so that the blade edge part of the blade material after the cutting has a miter shape.

In the invention, the pair of front and rear support faces may be formed in each of the right and left side faces of the stationary blade part. In this case, it is possible to employ a configuration wherein the pair of front and rear stationary edges which are disposed in the pair of support faces of one of the right and left side faces of the stationary blade part are straight-cutting edges for linearly forming a cut line which extends over the blade edge part and the strip plate part of the blade material after the cutting, and the pair of front and rear stationary edges which are disposed in the pair of support faces of another one of the right and left side faces are miter-cutting edges for conducting a cutting operation so that the blade edge part of the blade material after the cutting has a miter shape.

When the stationary blade part and its support faces are configured as described above, the two kinds of configurations which will be described below may be employed in the movable blade part.

In the first configuration, two movable blade parts are used. Namely, the movable blade parts are placed respectively in both the sides which sandwich the mutual gap, a pair of front and rear movable edges which cooperate with the pair of straight-cutting front and rear stationary edges to cut away a disposal portion of the blade material that is positioned between the stationary edges are disposed in the movable blade part on the one side, and a pair of front and rear movable edges which cooperate with the pair of miter-cutting front and rear stationary edges to cut away a disposal portion of the blade material that is positioned between the stationary edges are disposed in the movable blade parts on the other side.

In the second configuration, one movable blade part is used. Namely, the movable blade part is configured so as to be movable between one side and another side of the mutual gap with passing through the mutual gap, a pair of front and rear movable edges which cooperate with the pair of straight-cutting front and rear stationary edges to cut away a disposal portion of the blade material that is positioned between the stationary edges are disposed in the one side of right and left side faces of the movable blade part, and a pair of front and rear movable edges which cooperate with the pair of miter-cutting front and rear stationary edges to cut away a disposal portion of the blade material that is positioned between the stationary edges are disposed in the other side of the right and left side faces of the movable blade part.

According to the first configuration, the front end and the rear end of a blade material can be straight-cut or miter-cut by selectively using one of the two movable blade parts.

According to the second configuration, the front end and the rear end of a blade material can be straight-cut or miter-cut by selectively using the movable edges on one side of the single movable blade part and the movable edges on the other side.

Also the other blade material cutting device of the invention is employed for cutting a blade material in which a blade edge part is formed in an edge of a strip plate part.

The other blade material cutting device of the invention comprises: a stationary blade part having a support face on which the strip plate part and the blade edge part of the blade material are to be overlaid; a pair of front and rear stationary edges which are disposed in the support face, and which are positioned to be separated from each other by a gap in a direction of feeding the blade material; and a front movable blade part which is movable in front of the support face in lateral directions of the support face, and a rear movable blade part which is movable in rear of the support face in the lateral directions of the support face. Furthermore, the blade material cutting device comprises: a movable edge which is disposed in the front movable blade part, and which cooperates with the front stationary edge of the support face to cut the blade material; and a movable edge which is disposed in the rear movable blade part, and which cooperates with the rear stationary edge of the support face to cut the blade material.

According to the invention, two or front and rear portions of a blade material are cut by conducting two cutting operations. A disposal portion of the blade material positioned between the rear stationary edges is cut away. Namely, when, after the strip plate part and the blade edge part of the blade material are overlaid on the support face of the stationary blade part, the blade material is cut by using, for example, the movable edge of the front movable blade part, the blade material which is overlaid on the support face is cut while being supported by the support face. Therefore, the cut surface shape of the front end of the blade material is not bent but is maintained to the original adequate shape. Next, the blade material is fed by a predetermined length to cause the strip plate part and the blade edge part of another portion of the blade material to be overlaid on the support face, and the blade material is then cut by using the movable edge of the rear movable blade part. Since the blade material which is overlaid on the support face is cut while being supported by the support face, the cut surface shape of the rear end of the blade material is not bent but is maintained to the original adequate shape. In the case where the other blade material cutting device of the invention is used, it is necessary to cut away a disposal portion of the blade material by using the front movable blade part or the rear movable blade part, before the front end of the blade material is cut or after the rear end of the blade material is cut.

The above-mentioned function of the other blade material cutting device is exerted similarly even when each of the stationary edges and the movable edges of the front and rear movable blade parts is either of an edge for straight-cutting or an edge for miter-cutting.

In the above-mentioned other blade material cutting device, it is possible to employ a configuration wherein the pair of front and rear stationary edges which are disposed in the support face on one side among the support faces formed respectively in the right and left side faces of the stationary blade part are edges for straight-cutting, and the pair of front and rear stationary edges which are disposed in the support face on the other side are edges for miter-cutting edges.

When the stationary blade part and its support faces are configured as described above, the following configuration may be employed in the movable blade part.

Namely, it is possible to employ a configuration wherein a pair of right and left movable edges are disposed in the front movable blade part, the movable edge on one side is an edge which cooperates with the straight-cutting front stationary edge to cut the blade material, the movable edge on another side is an edge which cooperates with the miter-cutting front stationary edge to cut the blade material, a pair of right and left movable edges are disposed in the rear movable blade part, the movable edge on one side is an edge which cooperates with the straight-cutting rear stationary edge to cut the blade material, and the movable edge on another side is an edge which cooperates with the miter-cutting rear stationary edge to cut the blade material.

When this configuration is employed, the front end and the rear end of a blade material can be straight-cut or miter-cut by selectively using movable edges on one side and the other side of the front movable blade part and the rear movable blade part.

In the further blade material cutting device of the invention, the stationary blade part is formed into a fork-like shape having a pair of right and left protrusions, the support face is formed in each of right and left side faces which are opposed between the pair of protrusions, a pair of front and rear stationary edges disposed in the support face on one side are straight-cutting edges, and a pair of front and rear stationary edges disposed in the support face on another side are miter-cutting edges.

Furthermore, a pair of right and left movable edges are disposed in the front movable blade part, the movable edge on one side is an edge which cooperates with the straight-cutting front stationary edge to cut the blade material, and the movable edge on another side is an edge which cooperates with the miter-cutting front stationary edge to cut the blade material. Similarly, a pair of right and left movable edges are disposed also in the rear movable blade part, the movable edge on one side is an edge which cooperates with the straight-cutting rear stationary edge to cut the blade material, and the movable edge on another side is an edge which cooperates with the miter-cutting rear stationary edge to cut the blade material.

Also when this configuration is employed, the front end and the rear end of a blade material can be straight-cut or miter-cut by selectively using movable edges on one side and the other side of the front movable blade part and the rear movable blade part.

BRIEF DESCRIPTION OF DRAWINGS

FIG. 1 is a front view showing a case where straight-cutting is conducted by a blade material cutting device of a first embodiment.

FIG. 2 is a side view showing the case where straight-cutting is conducted by the blade material cutting device of the first embodiment.

FIG. 3 is a section view taken along line III-III of FIG. 1.

FIG. 8 is a section view taken along line VIII-VIII of FIG. 6.

FIG. 14 is a front view of a blade material cutting device of a second embodiment.

FIG. 15 is a section view taken along line XV-XV of FIG. 14.

FIGS. 57A to 57D are views showing cut surface shapes of ends of blade materials which are miter-cut.

BEST MODE FOR CARRYING OUT THE INVENTION

Figure 4A:
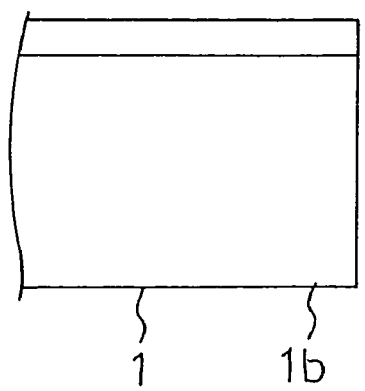
FIGS. 4A to 4C are side views of blade materials which are straight-cut.

A first embodiment of the invention will be described with reference to FIGS. 1 to 10.

A blade material cutting device of the embodiment comprises a stationary blade part 10, and a pair of right and left movable blade parts 50.

The stationary blade part 10 is divided into a pair of front and rear members 11, 12 which have a symmetrical shape. The members 11, 12 are longitudinally arranged with being separated from each other by a predetermined gap in a direction F of feeding the blade material 1. Lower portions of right and left side faces of the front member 11 are formed as support faces 13, 14, respectively. The rear end of the right support face 13 is formed as a stationary edge 13a for straight-cutting, and that of the left support face 14 is formed as a stationary edge 14a for miter-cutting. Similarly, also lower portions of right and left side faces of the rear member 12 are formed as support faces 15, 16, respectively. The front end of the right support face 15 is formed as a stationary edge 15a for straight-cutting, and that of the left support face 16 is formed as a stationary edge 16a for miter-cutting. In this configuration, the right support faces 13, 15 of the members 11, 12 are faces which are to be overlaid with the strip plate part 2 and the blade edge part 3 of the blade material 1 that is to be straight-cut, and the left support faces 14, 16 of the members 11, 12 are faces which are to be overlaid with the strip plate part 2 and the blade edge part 3 of the blade material 1 that is to be miter-cut. The stationary edges 13a, 15a which are disposed in the right support faces 13, 15 of the members 11, 12 are opposed to each other in the direction F of feeding the blade material 1, and also the stationary edges 14a, 16a which are disposed in the left support faces 14, 16 are opposed to each other in the direction F of feeding the blade material 1.

The movable blade parts 50, 50 are placed respectively on both the sides of a mutual gap between the front and rear members 11, 12, i.e., both the sides sandwiching a mutual gap 51 between the support faces 13, 15 which are arranged in front and rear of the front and rear members 11, 12. The movable blade parts 50, 50 are extractable and retractable with respect to the mutual gap 51. The front end corners of the right and left movable blade parts 50, 50 are formed as stationary edges 52a, and also the rear end corners of the movable blade parts are formed as stationary edges 52b. The front and rear stationary edges 52a, 52b of the right movable blade part 50 are formed as those for straight-cutting which cooperate with the above-mentioned pair of front and rear stationary edges 13a, 15a for straight-cutting, and the front and rear stationary edges 52a, 52b of the left movable blade part 50 are formed as those for miter-cutting which cooperate with the above-mentioned pair of front and rear stationary edges 14a, 16a for miter-cutting.

In the blade material cutting device, the straight-cut work is conducted in the following manner.

Figure 5A:
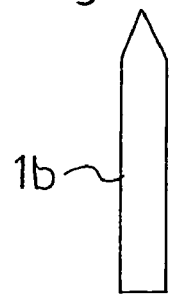
FIGS. 5A to 5C are views showing cut surface shapes of the blade materials which are straight-cut.
Figure 4B:
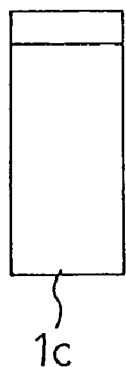
Figure 5B:
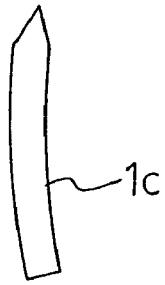
Figure 4C:
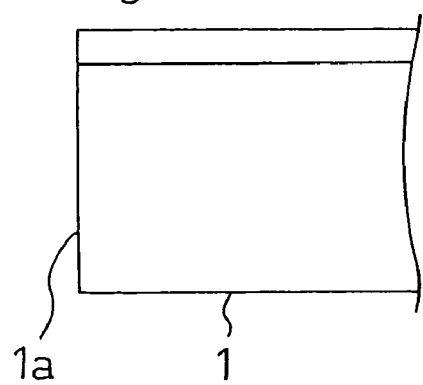
Figure 5C:
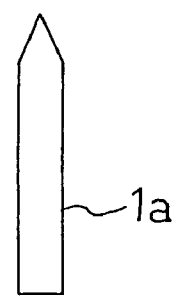

As shown in FIGS. 1 to 3, the strip plate part 2 and the blade edge part 3 of the blade material 1 are overlaid on the pair of front and rear support faces 13, 15 of the stationary blade part 10, and the right movable blade part 50 is then advanced from the right outside of the mutual gap 51 between the support faces 13, 15 toward the inside as indicated by the arrow b. As a result, the pair of front and rear stationary edges 13a, 15a on the side of the support faces 13, 15 cooperate with the pair of front and rear movable edges 52a, 52b of the right movable blade part 50, so that two or front and rear portions of the blade material are cut simply by a single cutting operation, and a disposal portion 1c of the blade material 1 positioned between the front and rear stationary edges 13a, 15a is cut away. In this case, the blade material 1 which is overlaid on the front support face 13 is cut while the blade material is kept to be supported by the support face 13, and hence the cut surface shape of the rear end 1b of the blade material 1 is not bent but is maintained to the original adequate shape as shown in FIGS. 4A and 5A. Similarly, also the blade material 1 which is overlaid on the rear support face is cut while the blade material is kept to be supported by the support face, and hence the cut surface shape of the front end 1a of the blade material 1 is not bent but is maintained to the original adequate shape as shown in FIGS. 4C and 5C. By contrast, the disposal portion 1c of the blade material 1 is cut away under a state where the portion is not supported by the support face, and hence the cut surface shape of the portion is bent as shown in FIGS. 4B and 5B. However, there arises no problem even when the disposal portion 1c is bent, because the portion will be abandoned.

In the blade material cutting device, the miter-cut work is conducted in the following manner.

Figure 6:
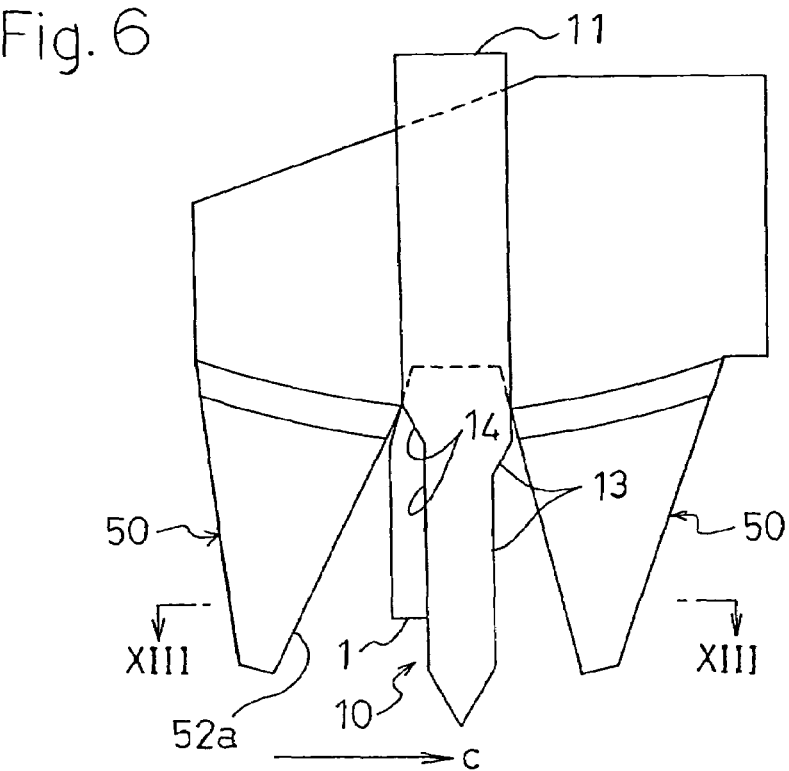
FIG. 6 is a front view showing a case where miter-cutting is conducted by the blade material cutting device of the first embodiment.
Figure 7:
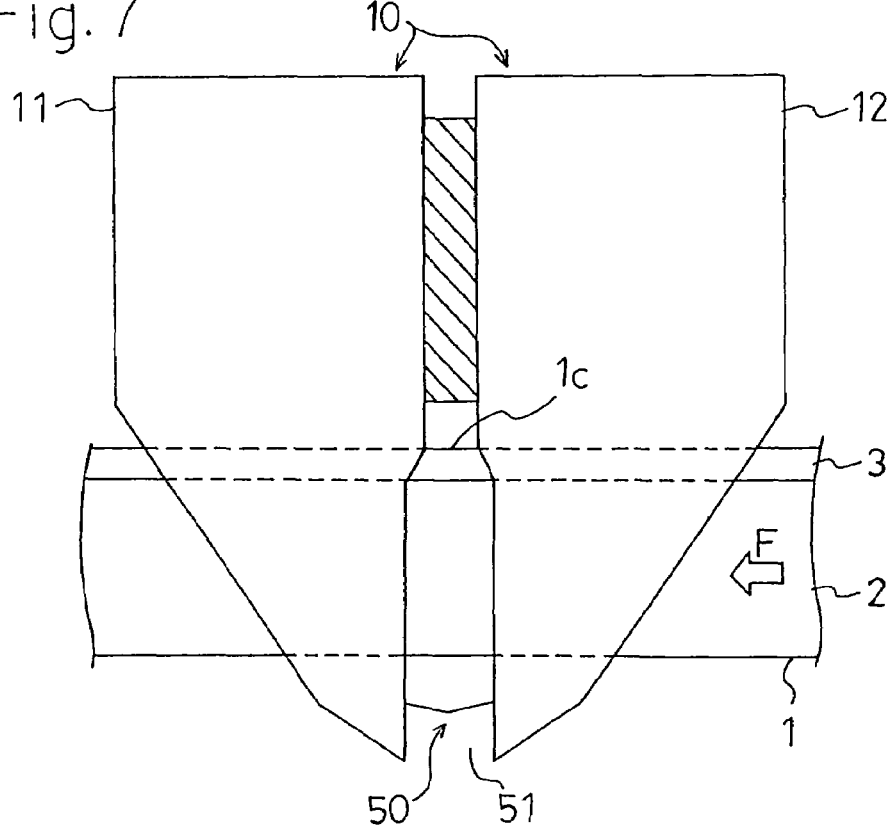
FIG. 7 is a side view showing the case where miter-cutting is conducted by the blade material cutting device of the first embodiment.
Figure 9A:
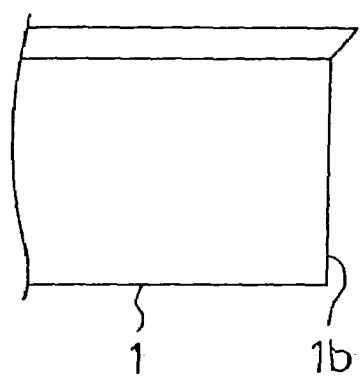
FIGS. 9A to 9C are side views of blade materials which are miter-cut.
Figure 10A:
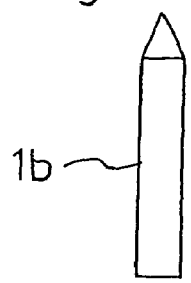
FIGS. 10A to 10C are views showing cut surface shapes of the blade materials which are miter-cut.
Figure 9B:
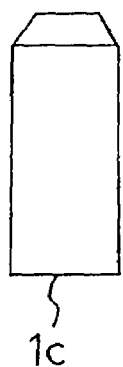
Figure 10B:
Figure 9C:
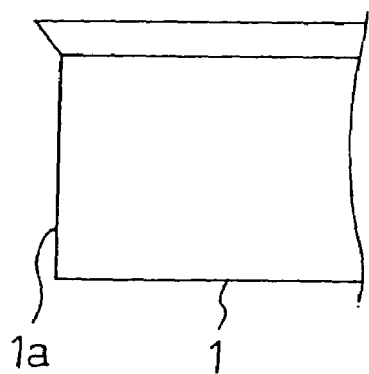
Figure 10C:
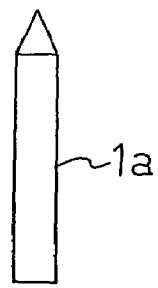

As shown in FIGS. 6 to 8, the strip plate part 2 and the blade edge part 3 of the blade material 1 are overlaid on the pair of front and rear support faces 14, 16 of the left side of the stationary blade part 10, and the left movable blade part 50 is then advanced from the left outside of the mutual gap 51 between the support faces 14, 16 toward the inside as indicated by the arrow c. As a result, the pair of front and rear stationary edges 14a, 16a on the side of the support faces 14, 16 cooperate with the pair of front and rear movable edges 52a, 52b of the left movable blade part 50, so that two or front and rear portions of the blade material are cut simply by a single cutting operation, and the disposal portion 1c of the blade material 1 positioned between the front and rear stationary edges 14a, 16a is cut away. In this case, the blade material 1 which is overlaid on the front support face 14 is cut while the blade material is kept to be supported by the support face 14, and hence the cut surface shape of the rear end 1b of the blade material 1 is not bent but is maintained to the original adequate shape as shown in FIGS. 9A and 10A. Similarly, also the blade material 1 which is overlaid on the rear support face is cut while the blade material is kept to be supported by the support face, and hence the cut surface shape of the front end 1a of the blade material 1 is not bent but is maintained to the original adequate shape as shown in FIGS. 9C and 10C. By contrast, the disposal portion 1c of the blade material 1 is cut away under a state where the portion is not supported by the support face, and hence the cut surface shape of the portion is bent as shown in FIGS. 9B and 10B. However, there arises no problem even when the disposal portion 1c is bent, because the portion will be abandoned.

As described above, according to the blade material cutting device, the front end 1a and the rear end 1b of the blade material 1 can be straight-cut or miter-cut by selectively using the two movable blade parts 50, 50 on the left side and the right side.

Figure 11:
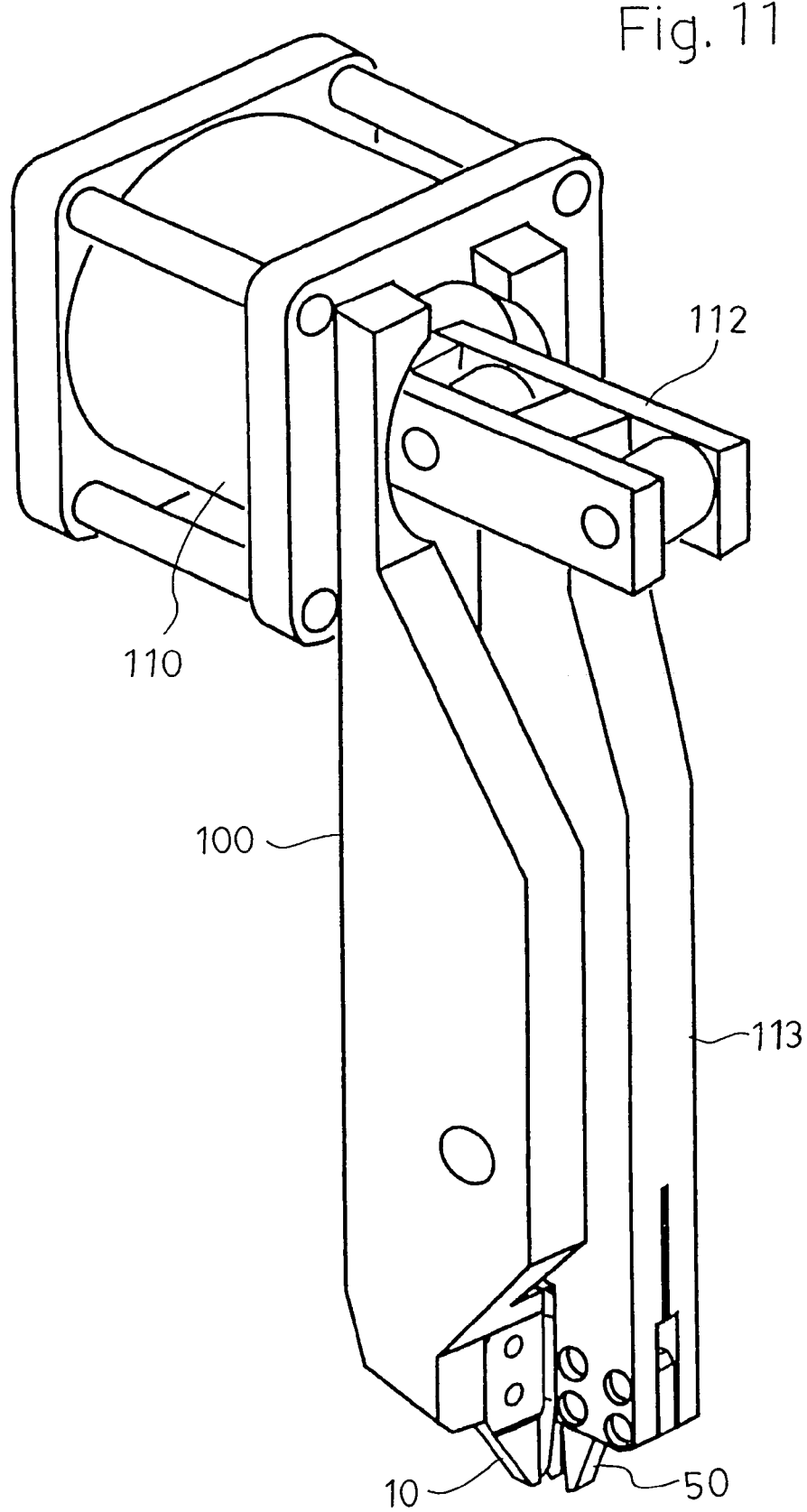
FIG. 11 is a diagrammatic perspective view showing an example of a driving portion of the blade material cutting device.
Figure 12:
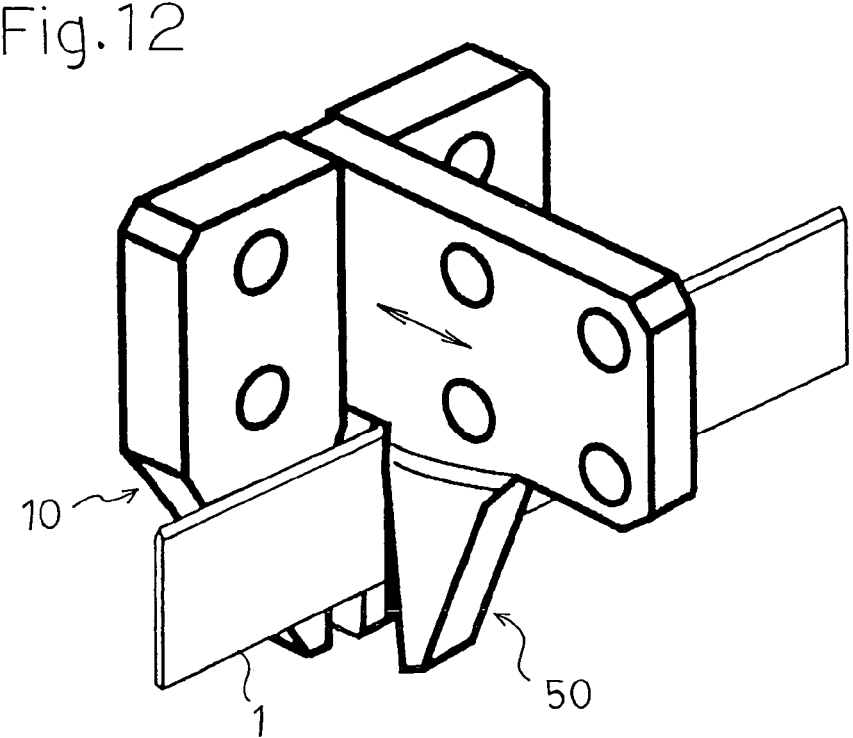
FIG. 12 is a perspective view showing the appearance of the blade material cutting device.

FIG. 11 shows an example of a driving portion of the above-mentioned blade material cutting device, and FIG. 12 is a perspective view showing the appearance of the blade material cutting device.

As seen from FIG. 11 or 12, the stationary blade part 10 is attached to a lower end portion of a structural body 100, a pushing and pulling mechanism 110 such as a cylinder is attached to an upper end portion of the structural body 100, and an extracting and retracting rod 112 of the pushing and pulling mechanism 110 is connected to the movable blade part 50 by a connecting rod 113. According to this configuration, the movable blade part 50 is laterally moved through pushing and pulling operations of the pushing and pulling mechanism 110, and the above-mentioned cutting operation is conducted by the movement.

In FIGS. 1 to 12, in order to facilitate understanding, identical or equivalent portions are denoted by the same reference numerals.

Figure 13:
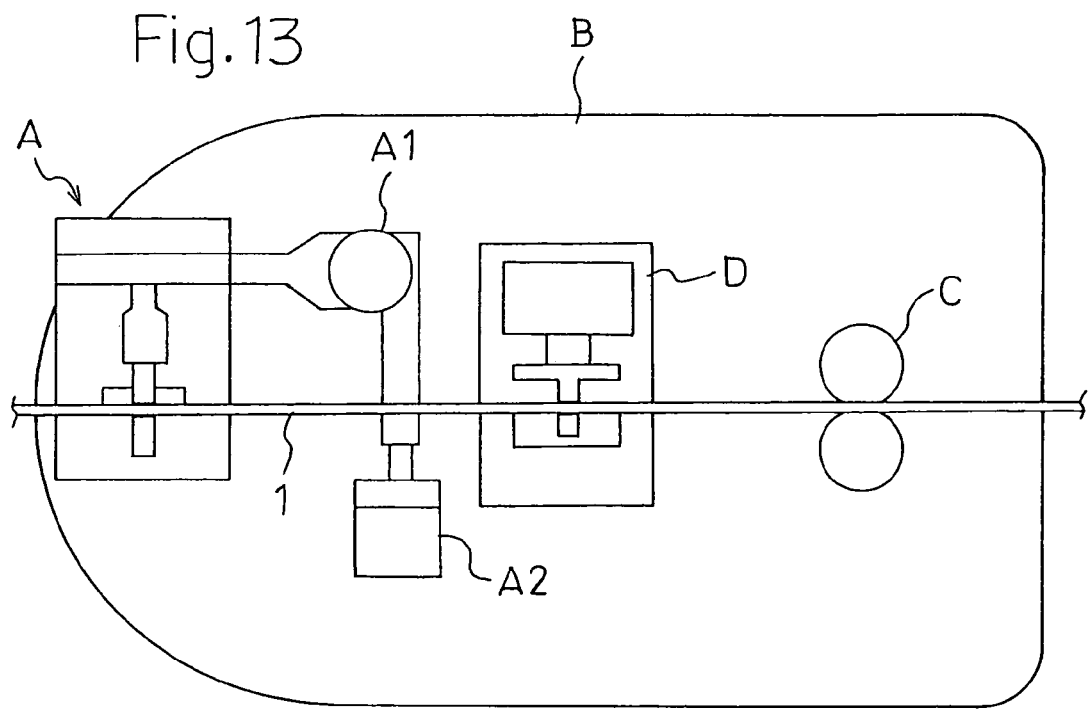
FIG. 13 is a diagrammatic view showing a table and the like for continuously conducting cutting steps.

FIG. 13 shows an example in which the above-mentioned blade material cutting device A is disposed on a table B in order to enable cutting steps to be continuously conducted. In the figure, C denotes blade material feeding rollers, and D denotes a bridge cutting mechanism for punching a concave removal part in the blade material 1. An elevating mechanism A1 for elevating and lowering a unit configured by the stationary blade part 10 and the movable blade part 50, an alignment mechanism A2 for aligning the support face used in the straight cutting of the stationary blade part 10 with the blade material 1, and for aligning the support face used in the miter cutting of the stationary blade part 10 with the blade material 1, and the like are additionally disposed in the blade material cutting device A.

A second embodiment of the invention will be described with reference to FIGS. 14 and 15.

In the blade material cutting device, the stationary blade part 10 is configured in the same manner as the stationary blade part 10 which has been described with reference to FIG. 3 and the like, but the movable blade part is configured in a different manner.

In the second embodiment, as shown in FIGS. 14 and 15, the single movable blade part 50 is configured so as to be movable between the right side and the left side of the mutual gap 51 with passing through the mutual gap 51. A pair of front and rear movable edges 52a, 52b which cooperate with the pair of straight-cutting front and rear stationary edges 13a, 15a to cut away the disposal portion 1c of the blade material 1 that is positioned between the stationary edges 13a, 15a are disposed in the left side face 52 of the movable blade part 50. A pair of front and rear movable edges 53a, 53b which cooperate with the pair of miter-cutting front and rear stationary edges 14a, 16a to cut away the disposal portion 1c of the blade material 1 that is positioned between the stationary edges 14a, 16a are disposed in the right side face 53 of the movable blade part 50.

In the blade material cutting device of the second embodiment, the movable blade part 50 is configured so as to be laterally swingable about a fulcrum 54 which is defined above the stationary blade part 10. A swinging driving portion for the movable blade part 50 can be formed by using, for example, a cylinder.

According to the blade material cutting device of the second embodiment, the front end and the rear end of the blade material 1 can be straight-cut or miter-cut by selectively using the movable edges 52a, 52b on the left side of the single movable blade part 50 and the movable edges 53a and 53b on the right side.

Namely, the straight-cut work is conducted in the following manner.

As indicated by the solid lines in FIGS. 14 and 15, the strip plate part 2 and the blade edge part 3 of the blade material 1 are overlaid on the pair of front and rear support faces 13, 15 of the stationary blade part 10, and the movable blade part 50 is then advanced from the right side to the left side of the mutual gap 51 between the support faces 13, 15 as indicated by the arrow d. As a result, the pair of front and rear stationary edges 13a, 15a on the side of the support faces 13, 15 cooperate with the left movable edges 52a, 52b of the movable blade part 50, so that two or front and rear portions of the blade material are cut simply by a single cutting operation, and the disposal portion 1c of the blade material 1 positioned between the front and rear stationary edges 13a, 15a is cut away. In this case, the blade material 1 which is overlaid on the front support face 13, and the blade material 1 which is overlaid on the rear support face 15 are cut while the blade material is kept to be supported by the support faces 13, 15, and hence the cut surface shapes of the rear end 1b and the front end 1a of the blade material 1 are not bent but are maintained to the original adequate shape. By contrast, the disposal portion 1c of the blade material 1 is cut away under a state where the portion is not supported by the support faces 13, 15, and hence the cut surface shape of the portion is bent. However, there arises no problem even when the disposal portion 1c is bent, because the portion will be abandoned.

The miter-cut work is conducted in the following manner.

As indicated by the phantom lines in FIGS. 14 and 15, the strip plate part 2 and the blade edge part 3 of the blade material 1 are overlaid on the pair of front and rear support faces 14, 16 of the stationary blade part 10, and the movable blade part 50 is then advanced from the left side to the right side of the mutual gap 51 between the support faces 14, 16 as indicated by the arrow e. As a result, the pair of front and rear stationary edges 14a, 16a on the side of the support faces 14, 16 cooperate with the right movable edges 53a, 53b of the movable blade part 50, so that two or front and rear portions of the blade material are cut simply by a single cutting operation, and the disposal portion 1c of the blade material 1 positioned between the front and rear stationary edges 13a, 15a is cut away. In this case, the blade material 1 which is overlaid on the front support face 14, and the blade material 1 which is overlaid on the rear support face 16 are cut while the blade material is kept to be supported by the support faces 14, 16, and hence the cut surface shapes of the rear end 1b and the front end 1a of the blade material 1 are not bent but are maintained to the original adequate shape. By contrast, the disposal portion 1c of the blade material 1 is cut away under a state where the portion is not supported by the support faces 14, 16, and hence the cut surface shape of the portion is bent. However, there arises no problem even when the disposal portion 1c is bent, because the portion will be abandoned.

A third embodiment of the invention will be described with reference to FIGS. 16 to 28.

Also a blade material cutting device of the embodiment comprises one stationary blade part 20, and a pair of front and rear movable blade parts 60, 60.

Lower portions of right and left side faces of the stationary blade part 20 are formed as support faces 23, 24, respectively. The front and rear ends of the right support face 23 are formed as stationary edges 23a, 23a for straight-cutting, and those of the left support face 24 are formed as stationary edges 24a, 24a for miter-cutting. In this configuration, the right support face 23 is a face which is to be overlaid with the strip plate part 2 and the blade edge part 3 of the blade material 1 that is to be straight-cut (see FIGS. 16 to 18), and the left support face 24 is a face which is to be overlaid with the strip plate part 2 and the blade edge part 3 of the blade material 1 that is to be miter-cut. The pair of front and rear stationary edges 23a, 23a on the right side, and the pair of front and rear stationary edges 24a, 24a on the left side are positioned with being separated from each other by a gap in the direction F of feeding the blade material.

In the pair of front and rear movable blade parts 60, 60, the front movable blade part 60 on the front side is movable in front of the right and left support faces 23, 24 of the stationary blade part 20 in the lateral directions of the support faces 23, 24. Furthermore, the rear movable blade part 60 on the rear side is movable in rear of the right and left support faces 23, 24 of the stationary blade part 20 in the lateral directions of the support faces 23, 24.

Each of right and left corners of the rear end of the front movable blade part 60 is formed as a movable edge. In the movable edges, the left movable edge 62a is an edge which cooperates with the straight-cutting stationary edge 23a on the front side of the right support face 23 of the stationary blade part 20 to cut the blade material 1. By contrast, the right movable edge 62b is an edge which cooperates with the miter-cutting stationary edge 24a on the front side of the left support face 24 of the stationary blade part 20 to cut the blade material 1.

Also each of right and left corners of the front end of the rear movable blade part 60 is formed as a movable edge. In the movable edges, the left movable edge 62a is an edge which cooperates with the straight-cutting stationary edge 23a on the rear side of the right support face 23 of the stationary blade part 20 to cut the blade material 1. By contrast, the right movable edge 62b is an edge which cooperates with the miter-cutting stationary edge 24a on the rear side of the left support face 24 of the stationary blade part 20 to cut the blade material 1.

According to the blade material cutting device of the third embodiment, the front end and the rear end of the blade material 1 can be straight-cut or miter-cut by selectively using the two kinds of movable edges 62a, 62b of the movable blade parts 60, 60.

The straight-cut work is conducted in the following manner.

Figure 16:
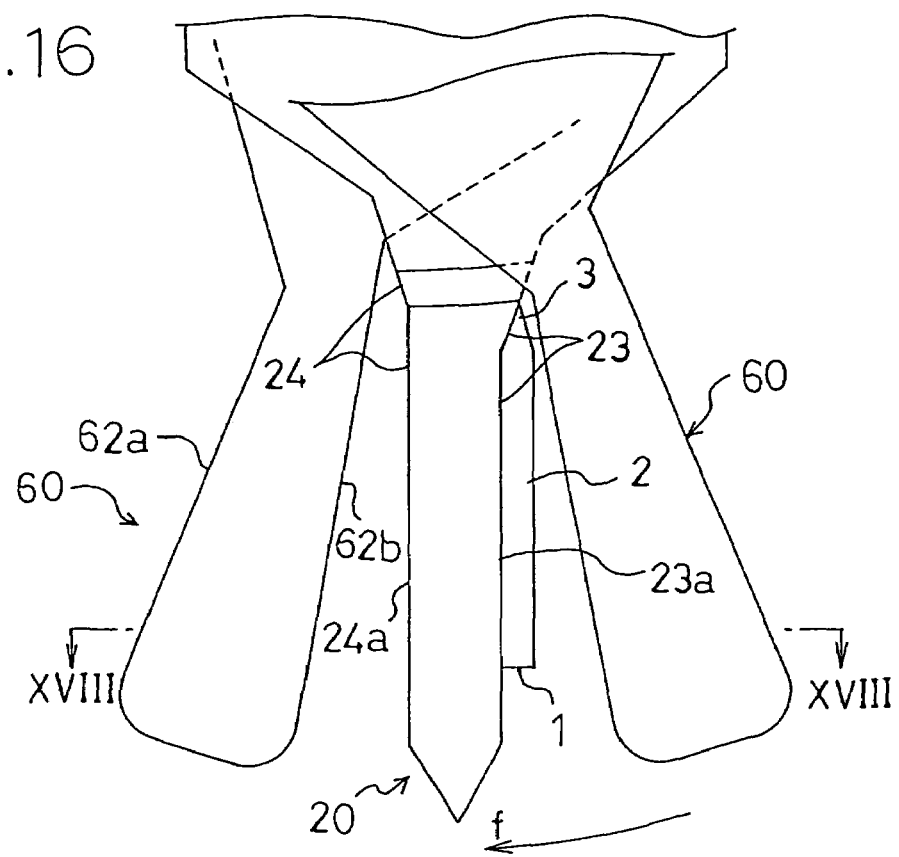
FIG. 16 is a front view showing a case where the front end of a blade material is straight-cut by a blade material cutting device of a third embodiment.
Figure 17:
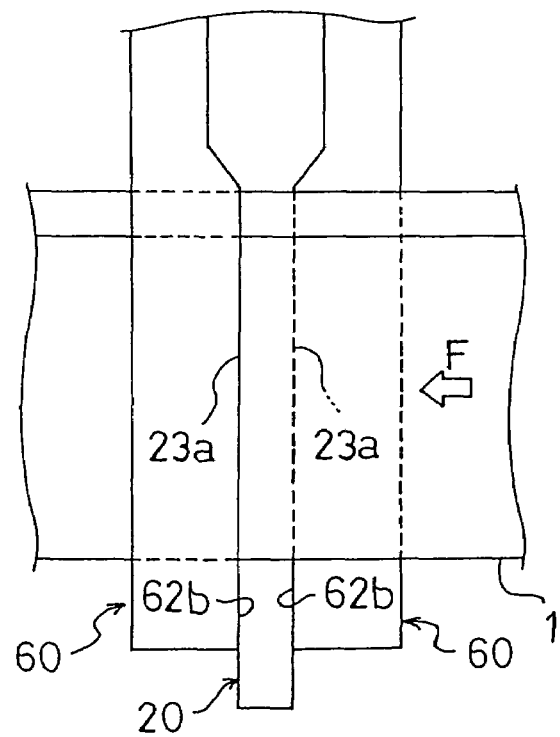
FIG. 17 is a side view showing the case where the front end of the blade material is straight-cut by the blade material cutting device of the third embodiment.
Figure 18:
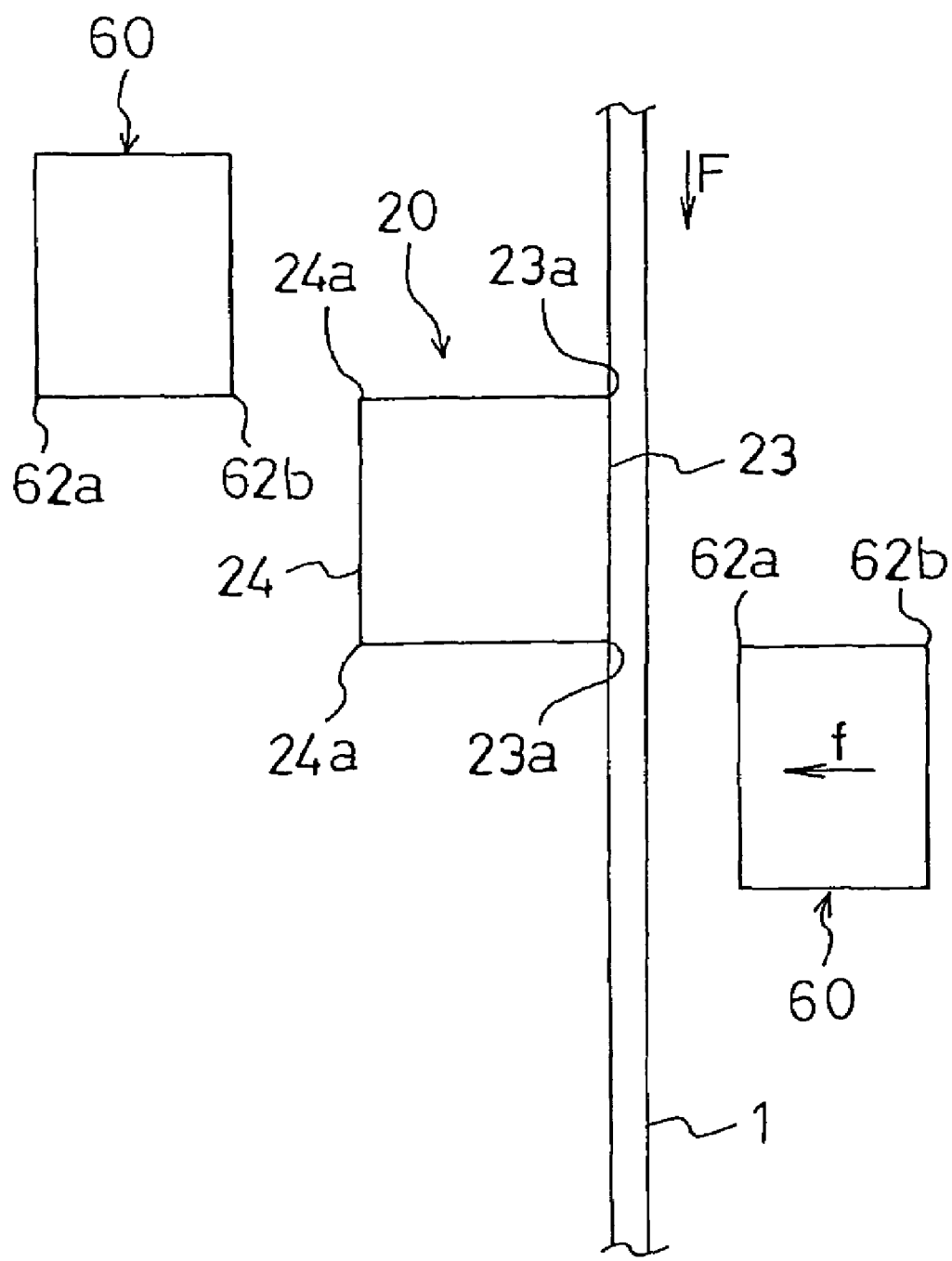
FIG. 18 is a section view taken along line XVIII-XVIII of FIG. 16.
Figure 19A:
FIGS. 19A and 19B are views showing the cut surface shape f the front end of the blade material which is straight-cut.
Figure 19B:
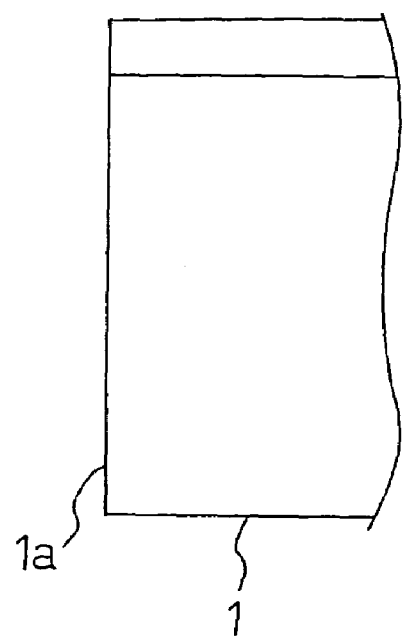
Figure 20:
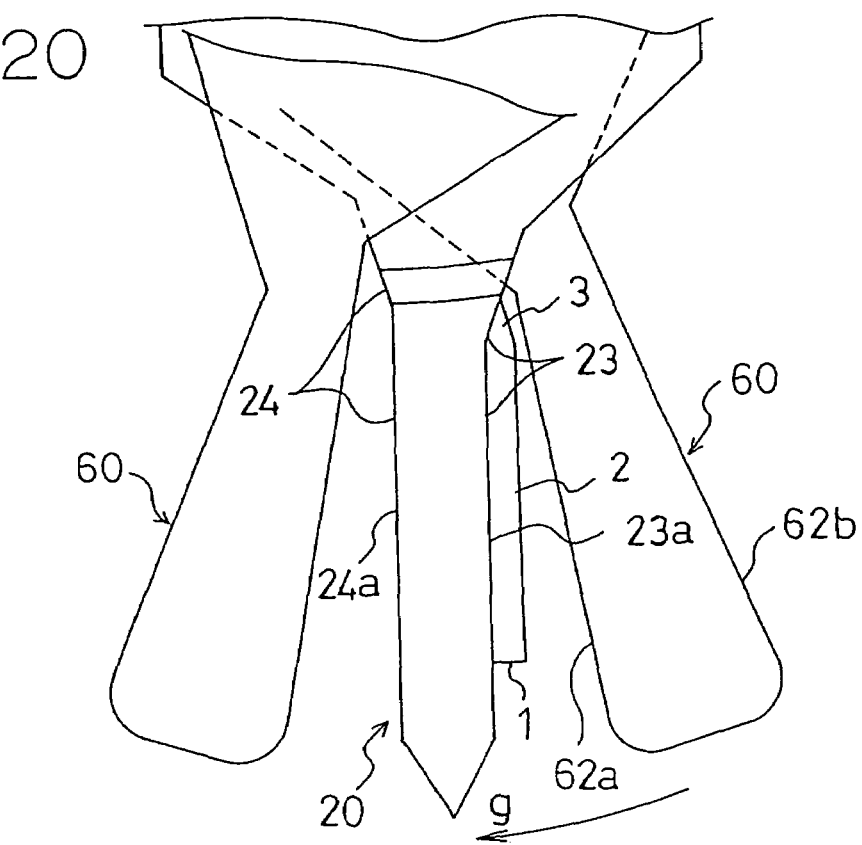
FIG. 20 is a front view showing a case where the rear end of the blade material is straight-cut by the blade material cutting device of the third embodiment.
Figure 21:
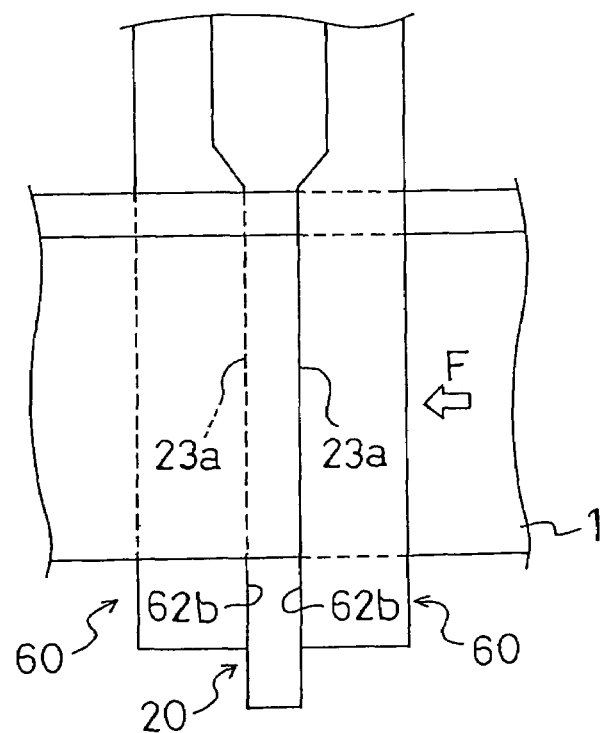
FIG. 21 is a side view showing the case where the rear end of the blade material is straight-cut by the blade material cutting device of the third embodiment.
Figure 21A:
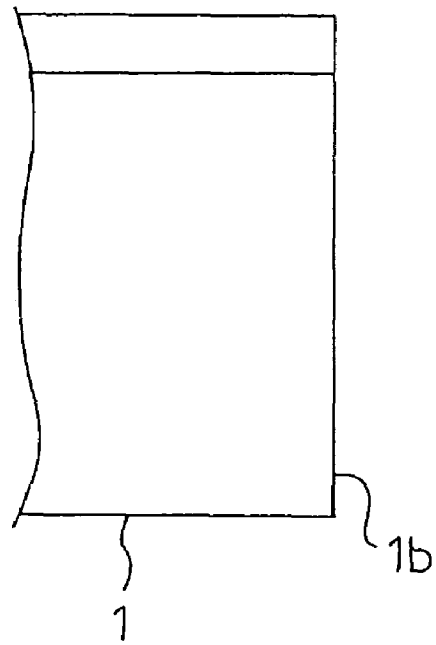
FIGS. 21A and 21B are views showing the cut surface shape of the rear end of the blade material which is straight-cut.
Figure 21B:

Namely, as shown in FIGS. 16 to 18, the strip plate part 2 and the blade edge part 3 of the blade material 1 are overlaid on the right support face 23 of the stationary blade part 20, and the front movable blade part 60 is then moved from the right side to the left side of the support face 23 of the stationary blade part 20 as indicated by the arrow f. As a result, the blade material 1 is cut by cooperation of the front stationary edge 23a on the side of the support face 23 with the left movable edge 62a of the front movable blade part 60. In this case, the blade material 1 which is overlaid on the support face 23 is cut while the blade material is kept to be supported by the support face 23, and hence the cut surface shape of the front end 1a of the blade material 1 is not bent but is maintained to the original adequate shape as shown in FIGS. 19A and 19B. Next, the blade material 1 is fed by a predetermined length, and the strip plate part 2 and the blade edge part 3 of the blade material 1 are then overlaid on the right support face 23 of the stationary blade part 20 as shown in FIGS. 20 and 21. Thereafter, the rear movable blade part 60 is moved from the right side to the left side of the support face 23 of the stationary blade part 20 as indicated by the arrow g. As a result, the blade material 1 is cut by cooperation of the rear stationary edge 23a on the side of the support face 23 with the left movable edge 62a (see FIG. 18) of the rear movable blade part 60. In this case, the blade material 1 which is overlaid on the support face 23 is cut while the blade material is kept to be supported by the support face 23, and hence the cut surface shape of the rear end 1b of the blade material 1 is not bent but is maintained to the original adequate shape as shown in FIGS. 21A and 21B.

The miter-cut work is conducted in the following manner.

Figure 22:
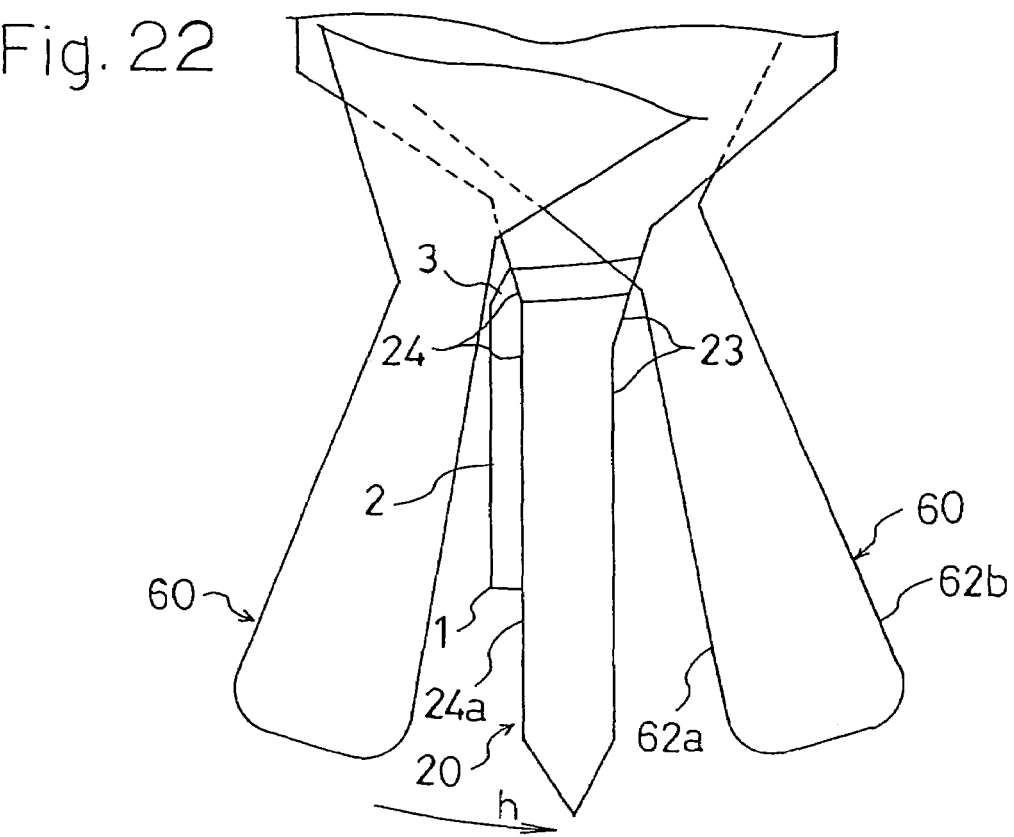
FIG. 22 is a front view showing a case where the front end of a blade material is miter-cut by the blade material cutting device of the third embodiment.
Figure 23:
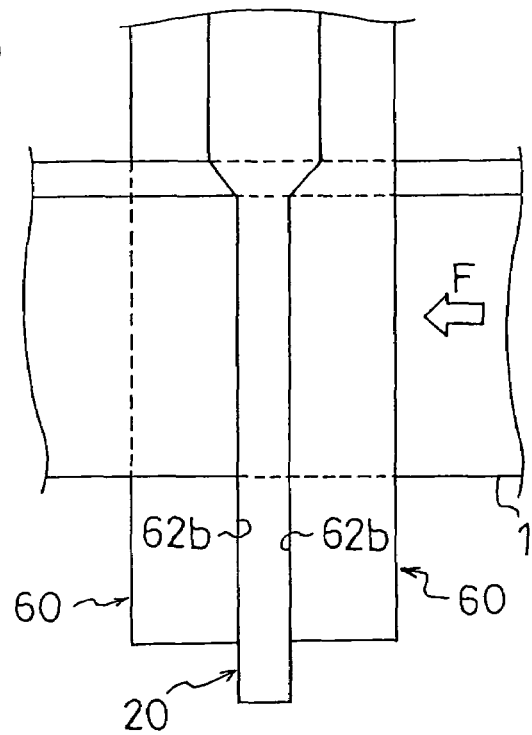
FIG. 23 is a side view showing the case where the front end of the blade material is miter-cut by the blade material cutting device of the third embodiment.
Figure 24A:
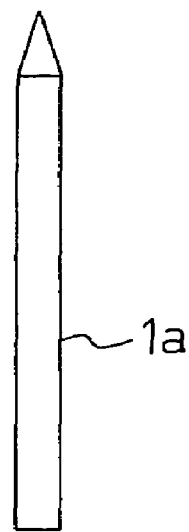
FIGS. 24A and 24B are views showing the cut surface shape of the front end of the blade material which is miter-cut.
Figure 24B:
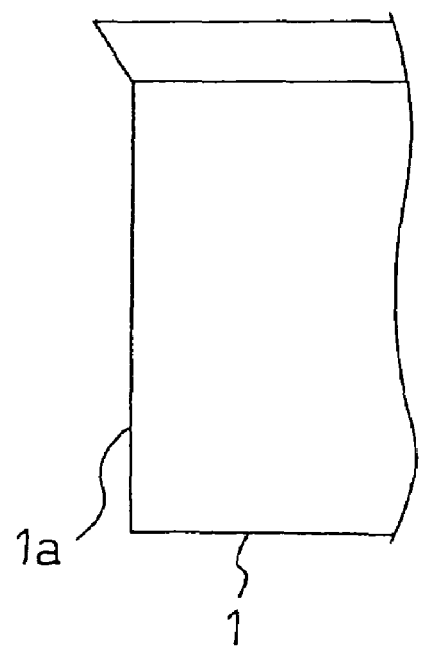
Figure 25:
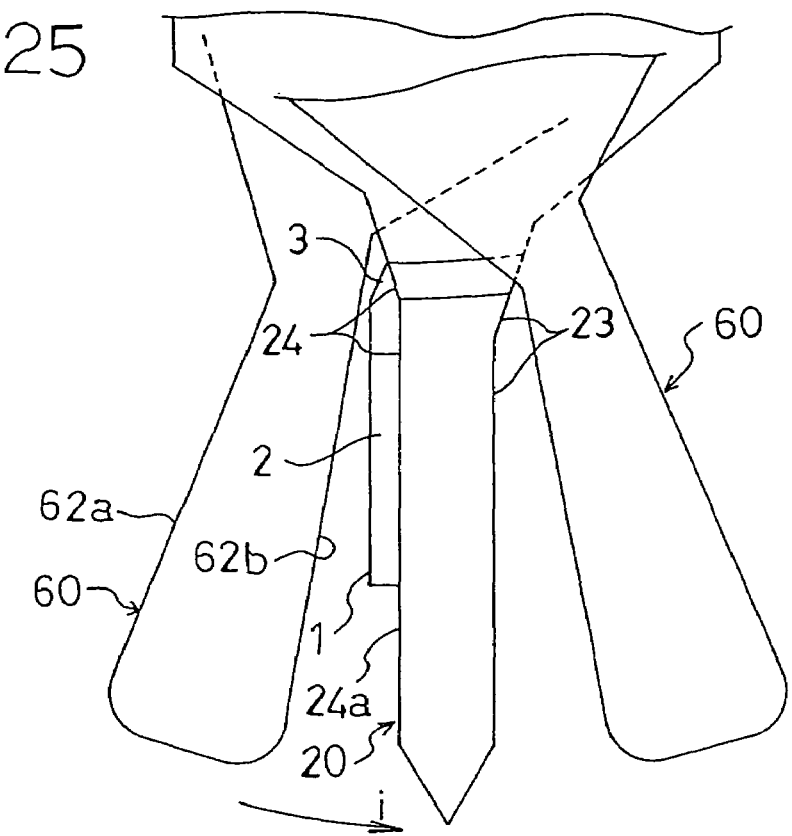
FIG. 25 is a front view showing a case where the rear end of the blade material is miter-cut by the blade material cutting device of the third embodiment.
Figure 26:
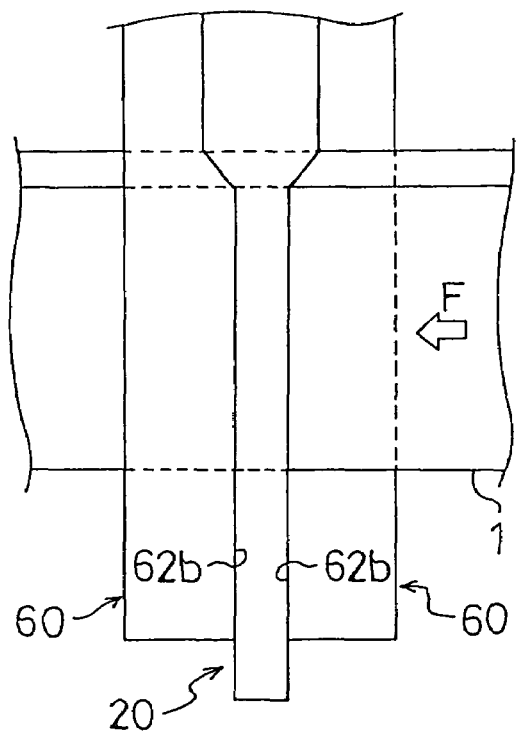
FIG. 26 is a side view showing the case where the rear end of the blade material is miter-cut by the blade material cutting device of the third embodiment.
Figure 27A:
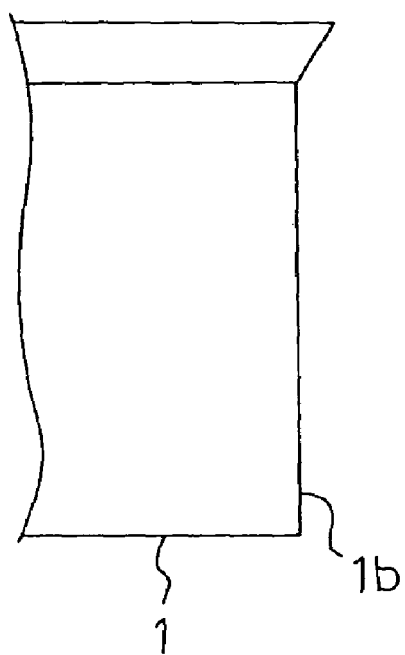
FIGS. 27A and 27B are views showing the cut surface shape of the rear end of the blade material which is straight-cut.
Figure 27B:
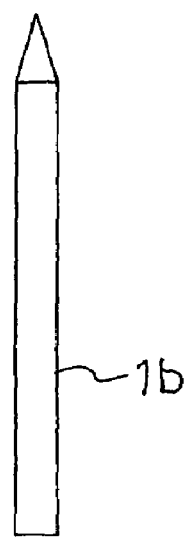

Namely, as shown in FIGS. 22 and 23, the strip plate part 2 and the blade edge part 3 of the blade material 1 are overlaid on the left support face 24 of the stationary blade part 20, and the front movable blade part 60 is then moved from the left side to the right side of the support face 24 of the stationary blade part 20 as indicated by the arrow h. As a result, the blade material 1 is cut by cooperation of the front stationary edge 24a on the side of the support face 24 with the right movable edge 62b of the front movable blade part 60. In this case, the blade material 1 which is overlaid on the support face 24 is cut while the blade material is kept to be supported by the support face 24, and hence the cut surface shape of the front end 1a of the blade material 1 is not bent but is maintained to the original adequate shape as shown in FIGS. 24A and 24B. Next, the blade material 1 is fed by a predetermined length, and the strip plate part 2 and the blade edge part 3 of the blade material 1 are then overlaid on the left support face 24 of the stationary blade part 20 as shown in FIGS. 25 and 26. Thereafter, the rear movable blade part 60 is moved from the left side to the right side of the support face 24 of the stationary blade part 20 as indicated by the arrow i. As a result, the blade material 1 is cut by cooperation of the rear stationary edge 24a on the side of the support face 24 with the right movable edge 62b of the rear movable blade part 60. In this case, the blade material 1 which is overlaid on the support face 24 is cut while the blade material is kept to be supported by the support face 24, and hence the cut surface shape of the rear end 1b of the blade material 1 is not bent but is maintained to the original adequate shape as shown in FIGS. 27A and 27B.

Figure 28:
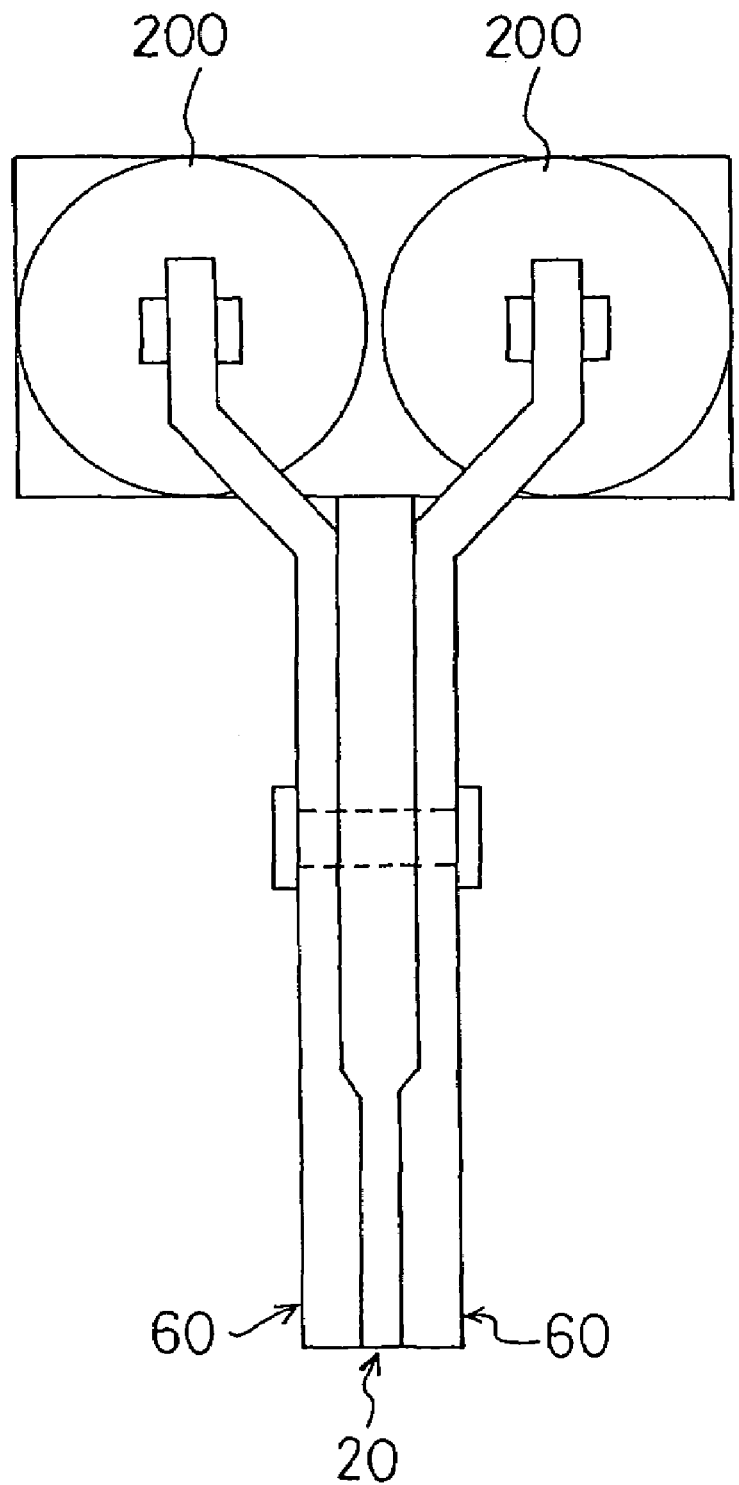
FIG. 28 is a diagrammatic perspective view showing an example of a driving portion for front and rear movable blade parts.

FIG. 28 shows an example of a driving portion of the blade material cutting device of the third embodiment. As shown in the figure, in the blade material cutting device of the third embodiment, the front movable blade part 60 and the rear movable blade part 60 are laterally swing-driven by pushing and pulling mechanisms 200, 200 respectively configured by separate cylinders.

A fourth embodiment of the invention will be described with reference to FIGS. 29 to 41A, and 41B.

In the blade material cutting device, the front movable blade part 60 and the rear movable blade part 60 are configured in the same manner as those of the third embodiment, but a stationary blade part 30 is configured in a different manner.

Figure 29:
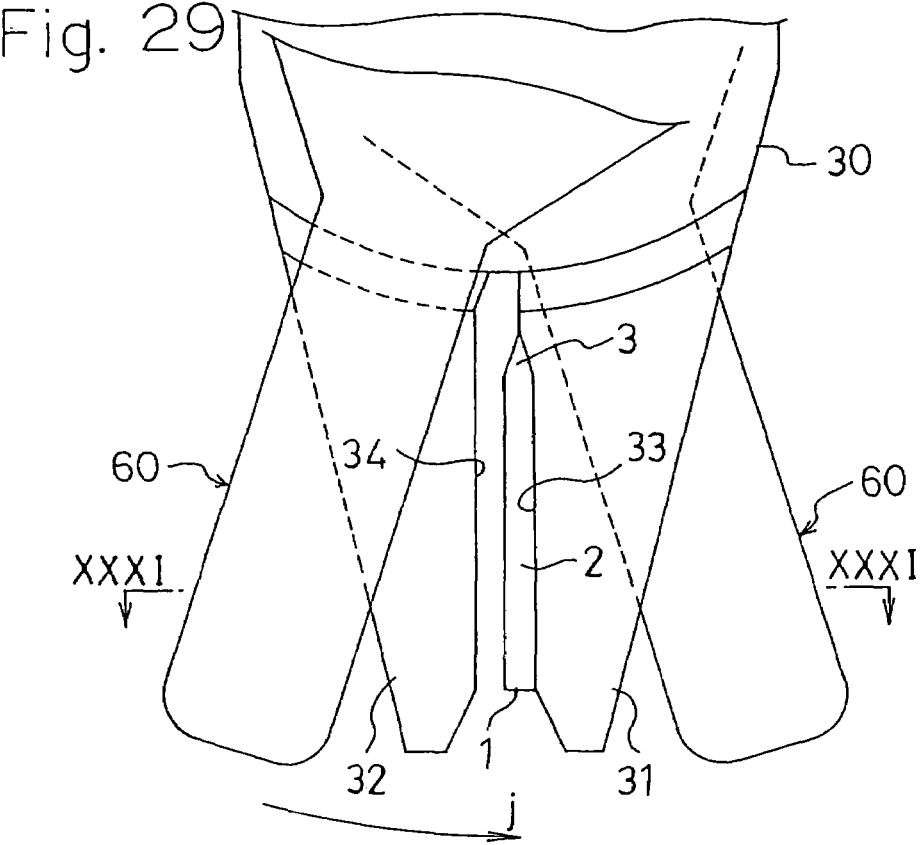
FIG. 29 is a front view showing a case where the front end of a blade material is straight-cut by a blade material cutting device of a fourth embodiment.
Figure 30:
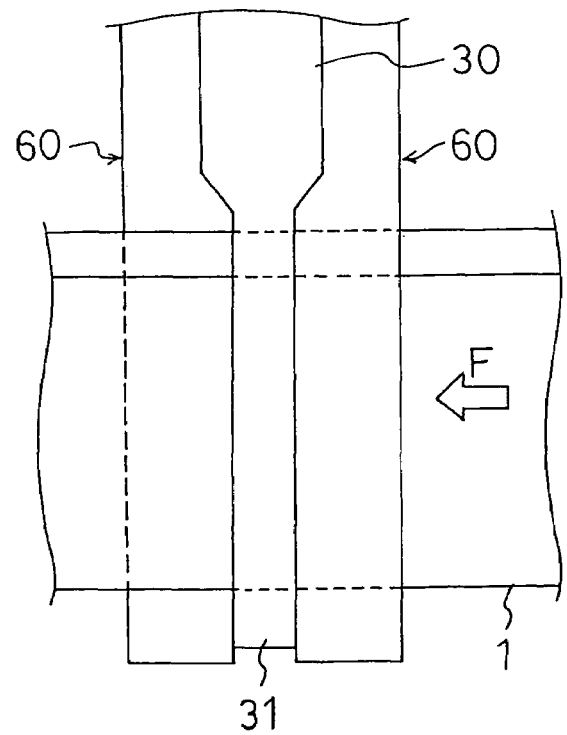
FIG. 30 is a side view showing the case where the front end of the blade material is straight-cut by the blade material cutting device of the fourth embodiment.
Figure 31:
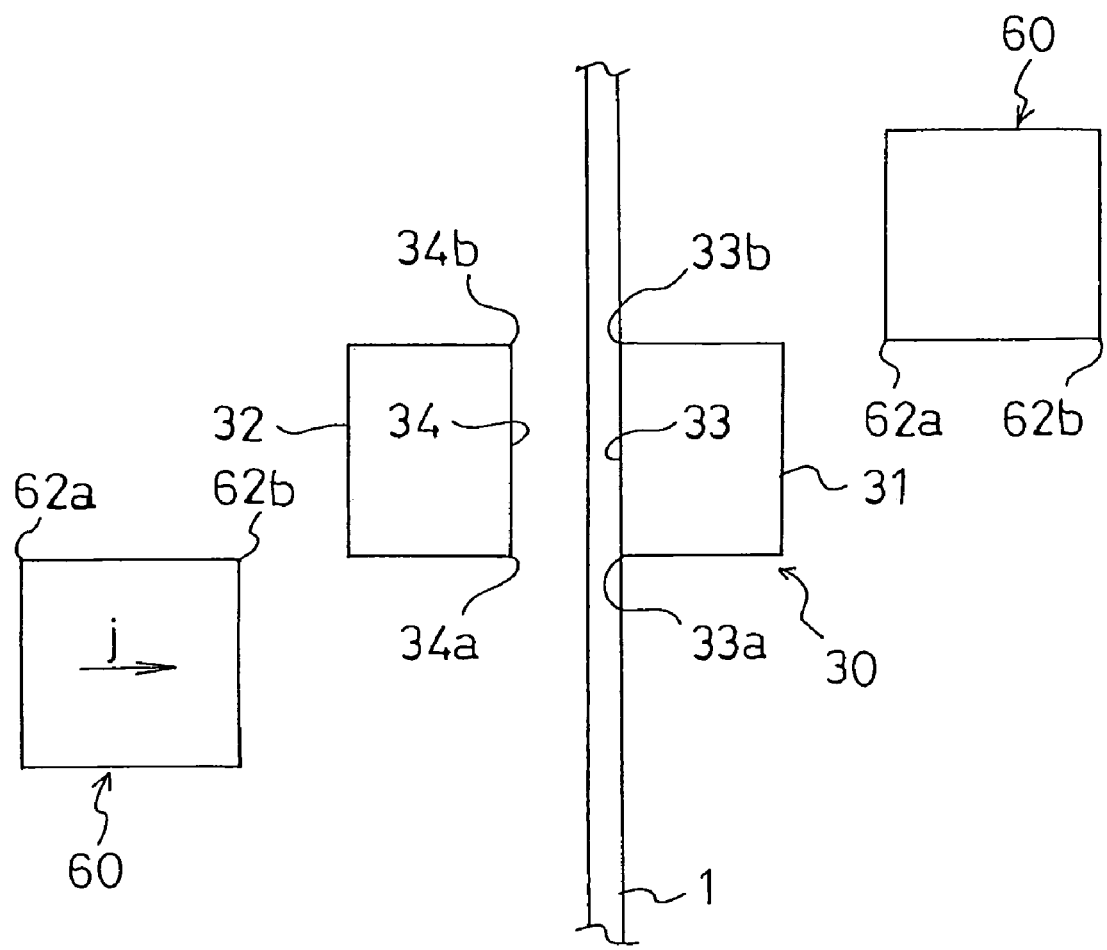
FIG. 31 is a section view taken along line XXXI-XXXI of FIG. 29.

In the fourth embodiment, the stationary blade part 30 is formed into a fork-like shape having a pair of right and left protrusions 31, 32 as shown in FIGS. 29 to 31 and the like. The support faces 33, 34 are formed respectively on right and left side faces which are opposed between of the pair of protrusions 31, 32. A pair of front and rear stationary edges 33a, 33b disposed in the right support face 33 serve as straight-cutting edges, and a pair of front and rear stationary edges 34a, 34b disposed in the left support face 34 serve as miter-cutting edges.

According to the blade material cutting device of the fourth embodiment, the front end and the rear end of the blade material 1 can be straight-cut or miter-cut by selectively using the two kinds of movable edges 62a, 62b of the front and rear movable blade parts 60, 60.

The straight-cut work is conducted in the following manner.

Figure 32A:
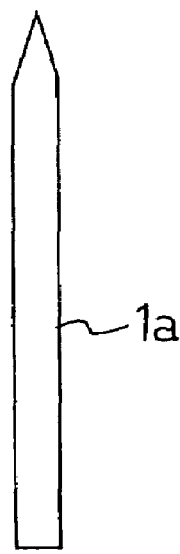
FIGS. 32A and 32B are views showing the cut surface shape of the front end of the blade material which is straight-cut.
Figure 32B:
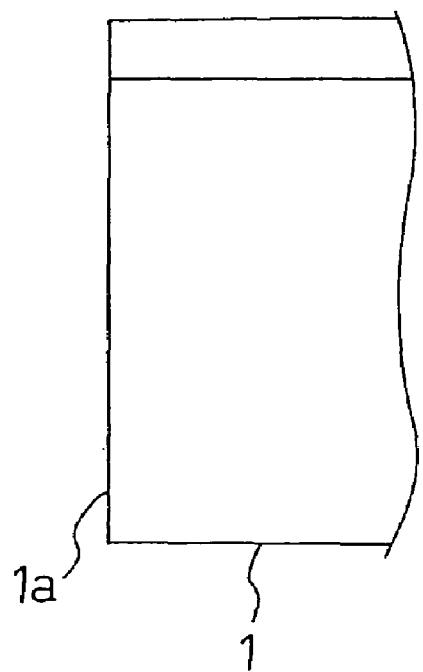
Figure 33:
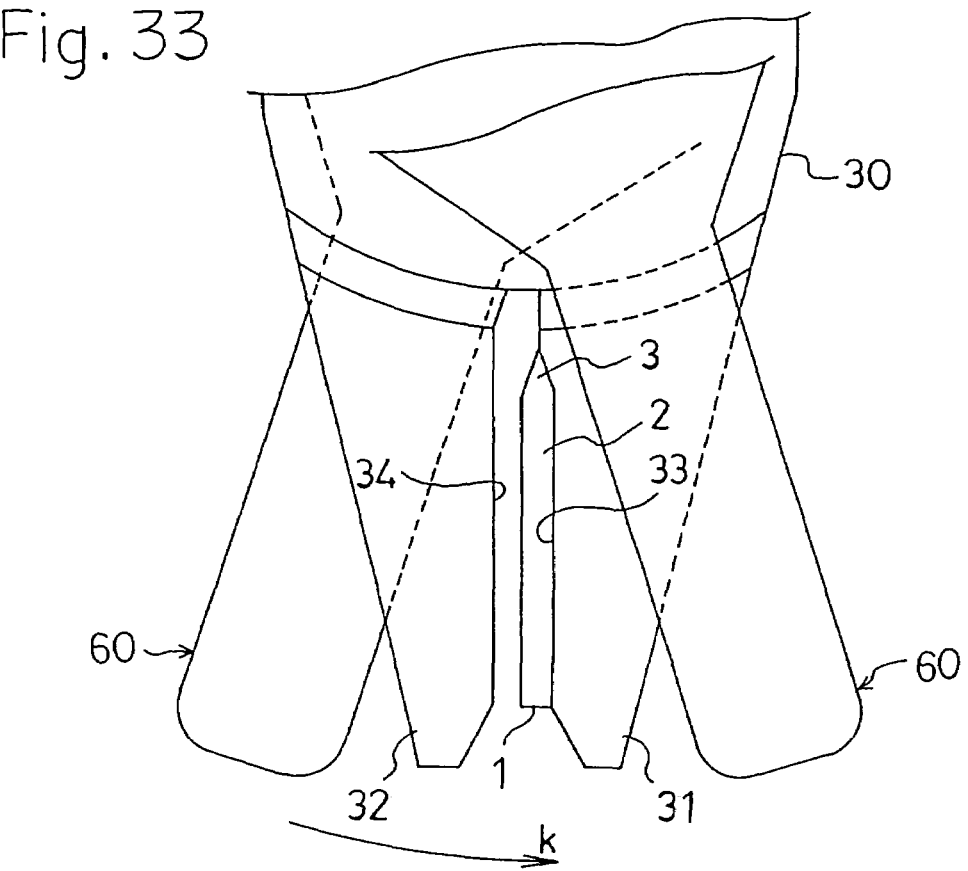
FIG. 33 is a front view showing a case where the rear end of the blade material is straight-cut by the blade material cutting device of the fourth embodiment.
Figure 34:
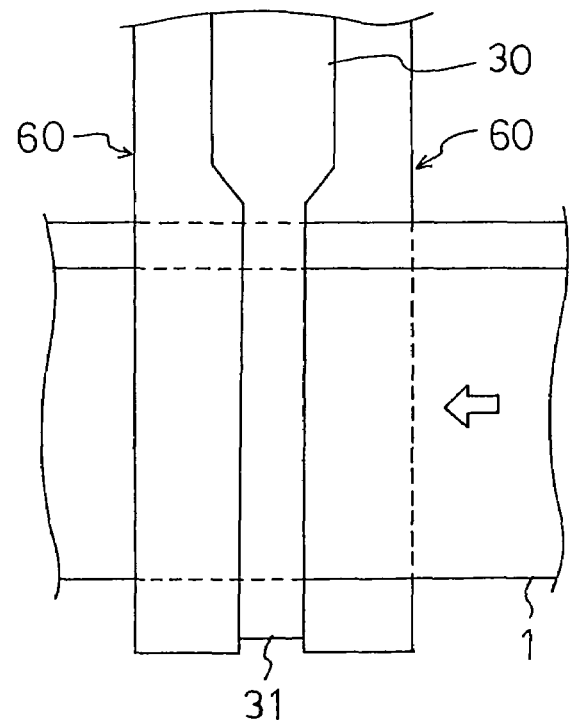
FIG. 34 is a side view showing the case where the rear end of the blade material is straight-cut by the blade material cutting device of the fourth embodiment.
Figure 35A:
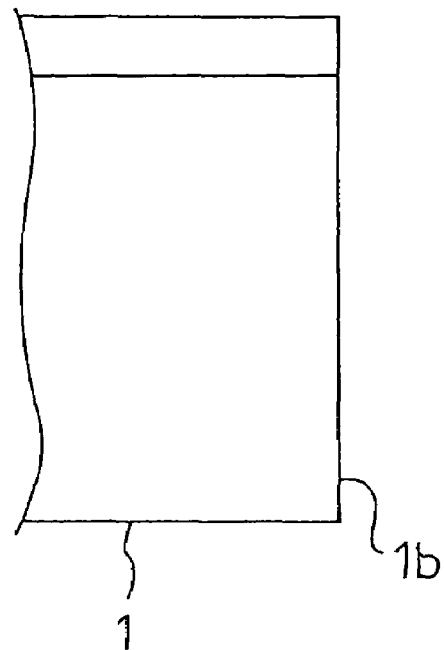
FIGS. 35A and 35B are views showing the cut surface shape of the rear end of the blade material which is straight-cut.
Figure 35B:
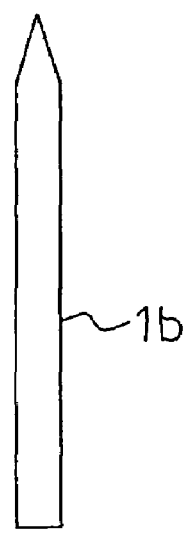

Namely, as shown in FIGS. 29 and 31, the strip plate part 2 and the blade edge part 3 of the blade material 1 are overlaid on the right support face 33 of the stationary blade part 30, and the front movable blade part 60 is then moved from the left side to the right side of the support face 33 as indicated by the arrow j. As a result, the blade material 1 is cut by cooperation of the front stationary edge 33a on the side of the support face 33 with the right movable edge 62b of the front movable blade part 60. In this case, the blade material 1 which is overlaid on the support face 33 is cut while the blade material is kept to be supported by the support face 33, and hence the cut surface shape of the front end 1a of the blade material 1 is not bent but is maintained to the original adequate shape as shown in FIGS. 32A and 32B. Next, the blade material 1 is fed by a predetermined length, and the strip plate part 2 and the blade edge part 3 of the blade material 1 are then overlaid on the right support face 33 of the stationary blade part 30 as shown in FIGS. 33 and 34. Thereafter, the rear movable blade part 60 is moved from the left side to the right side of the support face 33 of the stationary blade part 30 as indicated by the arrow k. As a result, the blade material 1 is cut by cooperation of the rear stationary edge 33b on the side of the support face 33 with the right movable edge 62b of the rear movable blade part 60. In this case, the blade material 1 which is overlaid on the support face 33 is cut while the blade material is kept to be supported by the support face 33, and hence the cut surface shape of the rear end 1b of the blade material 1 is not bent but is maintained to the original adequate shape as shown in FIGS. 35A and 35B.

The miter-cut work is conducted in the following manner.

Figure 36:
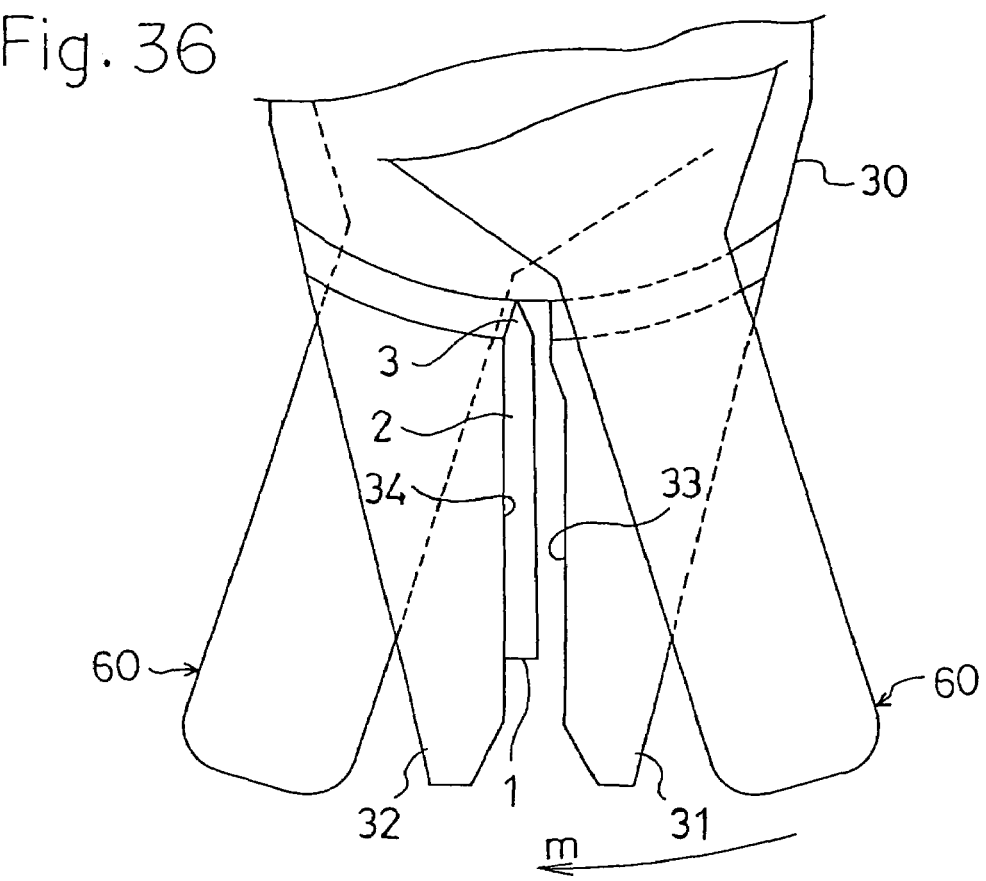
FIG. 36 is a front view showing a case where the front end of a blade material is miter-cut by the blade material cutting device of the fourth embodiment.
Figure 37:
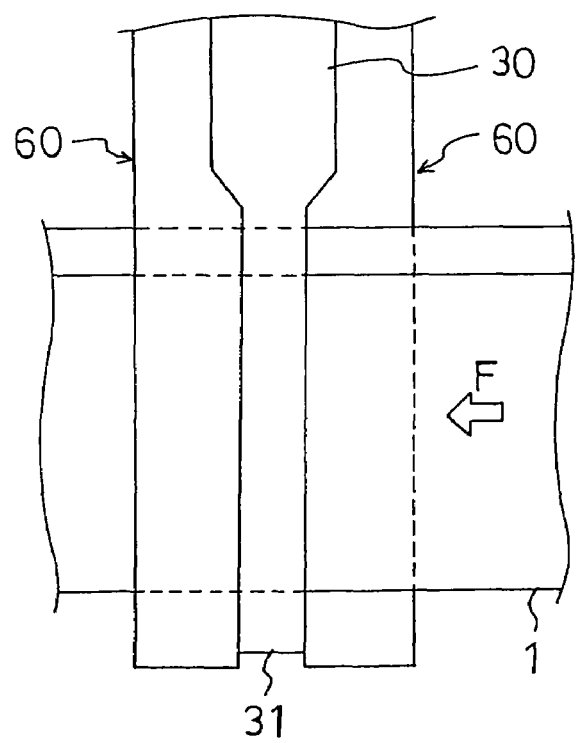
FIG. 37 is a side view showing the case where the front end of the blade material is miter-cut by the blade material cutting device of the fourth embodiment.
Figure 38A:
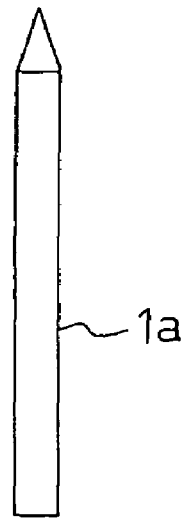
FIGS. 38A and 38B are views showing the cut surface shape of the front end of the blade material which is miter-cut.
Figure 38B:
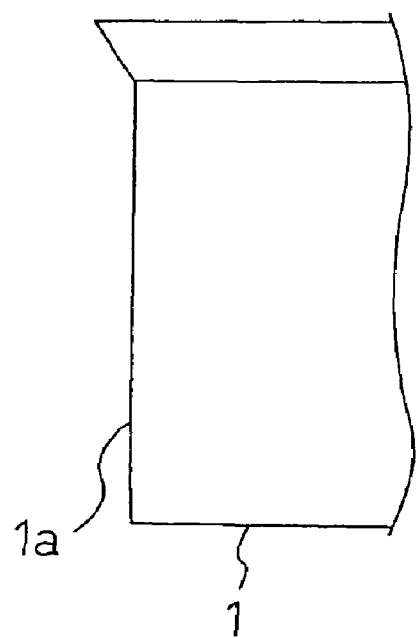
Figure 39:
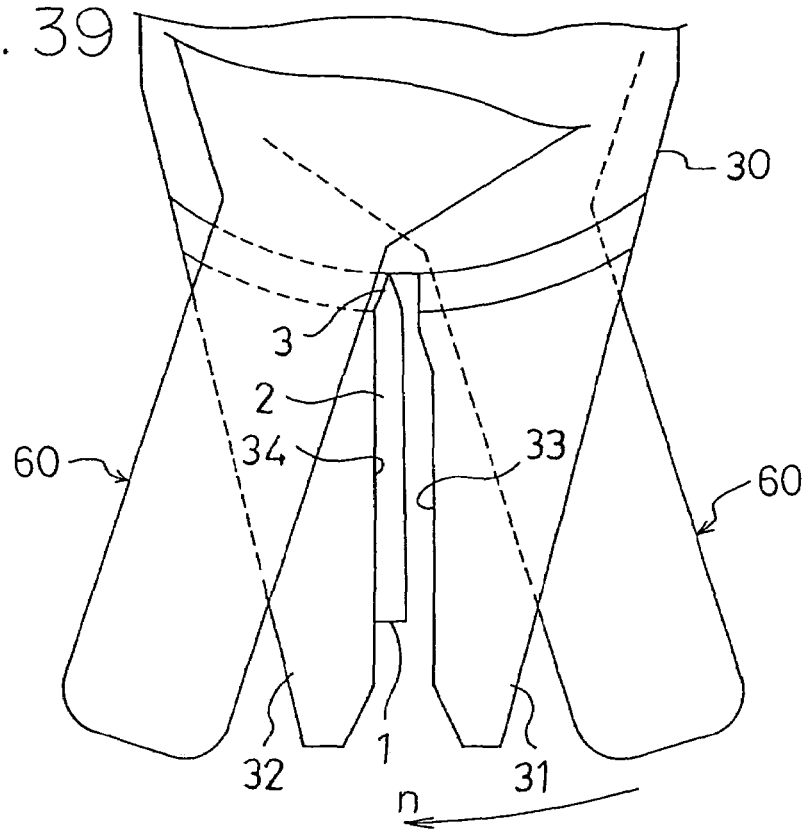
FIG. 39 is a front view showing a case where the rear end of the blade material is miter-cut by the blade material cutting device of the fourth embodiment.
Figure 40:
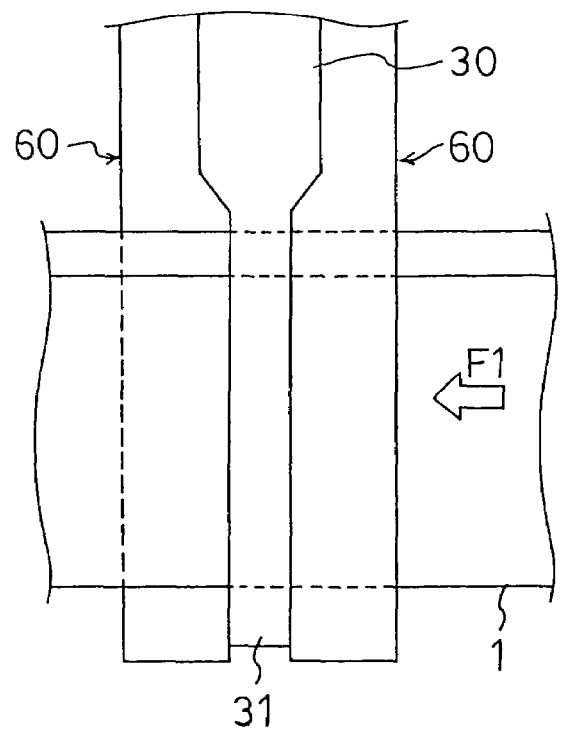
FIG. 40 is a side view showing the case where the rear end of the blade material is miter-cut by the blade material cutting device of the fourth embodiment.
Figure 41A:
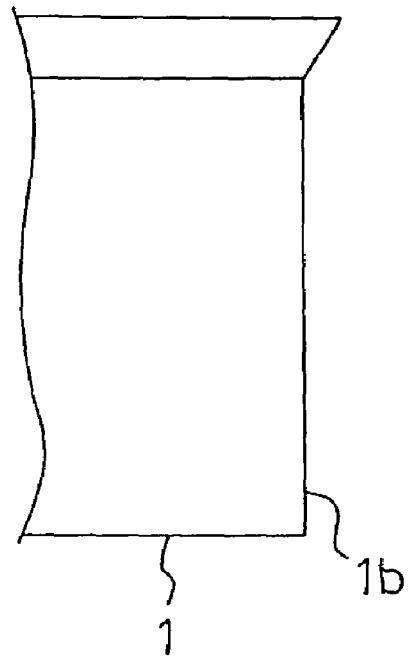
FIGS. 41A and 41B are views showing the cut surface shape of the rear end of the blade material which is straight-cut.
Figure 41B:
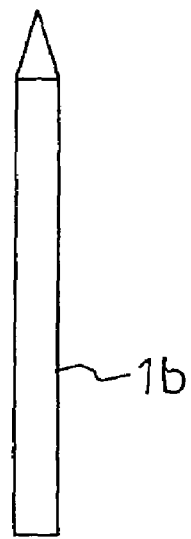

Namely, as shown in FIGS. 36 and 37, the strip plate part 2 and the blade edge part 3 of the blade material 1 are overlaid on the left support face 34 of the stationary blade part 30, and the front movable blade part 60 is then moved from the right side to the left side of the support face 34 of the stationary blade part 30 as indicated by the arrow m. As a result, the blade material 1 is cut by cooperation of the front stationary edge 34a on the side of the support face 34 with the left movable edge 62a of the front movable blade part 60. In this case, the blade material 1 which is overlaid on the support face 34 is cut while the blade material is kept to be supported by the support face 34 . . . , and hence the cut surface shape of the front end 1a of the blade material 1 is not bent but is maintained to the original adequate shape as shown in FIGS. 38A and 38B. Next, the blade material 1 is fed by a predetermined length, and the strip plate part 2 and the blade edge part 3 of the blade material 1 are then overlaid on the left support face 34 of the stationary blade part 30 as shown in FIGS. 39 and 40. Thereafter, the rear movable blade part 60 is moved from the right side to the left side of the support face 34 of the stationary blade part 30 as indicated by the arrow n. As a result, the blade material 1 is cut by cooperation of the rear stationary edge 34b on the side of the support face 34 with the left movable edge 62a of the rear movable blade part 60. In this case, the blade material 1 which is overlaid on the support face 34 is cut while the blade material is kept to be supported by the support face 34, and hence the cut surface shape of the rear end 1b of the blade material 1 is not bent but is maintained to the original adequate shape as shown in FIGS. 41A and 41B.

A driving portion of the blade material cutting device of the fourth embodiment can be configured so that, in the same manner as that described with reference to FIG. 28, the front movable blade part 60 and the rear movable blade part 60 are laterally swing-driven by pushing and pulling mechanisms 200, 200 respectively configured by separate cylinders.

Figure 42:
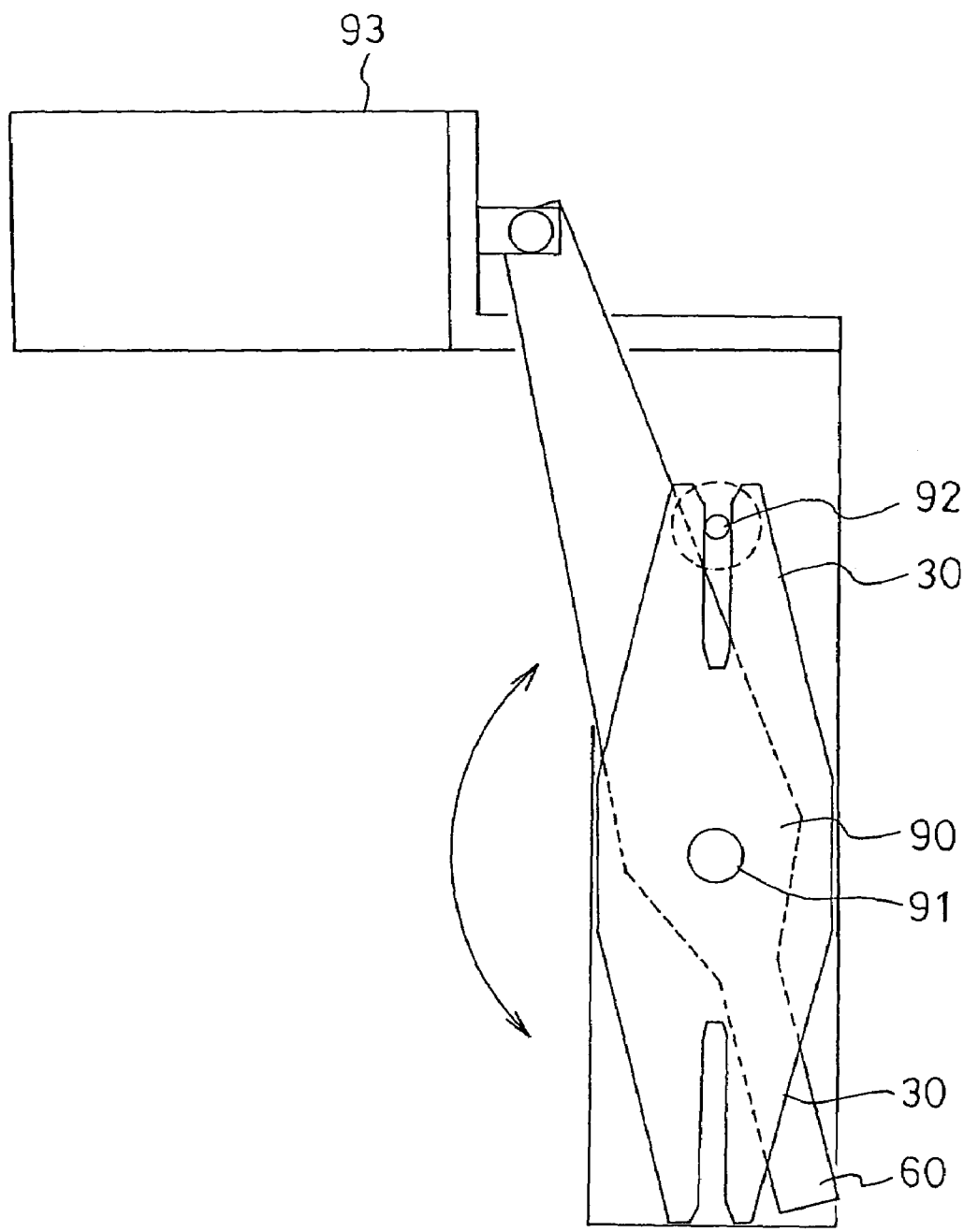
FIG. 42 is a front view showing a modification of a stationary blade part.
Figure 43:
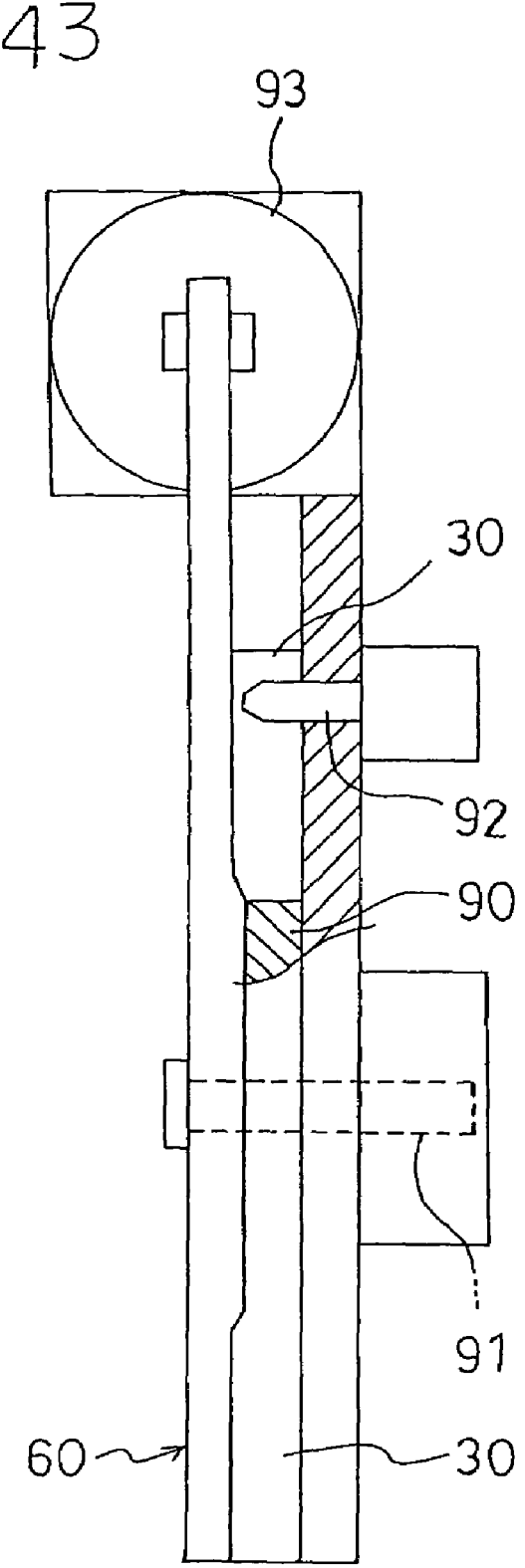
FIG. 43 is a diagrammatic side view of a blade material cutting device of FIG. 38.
Figure 44:
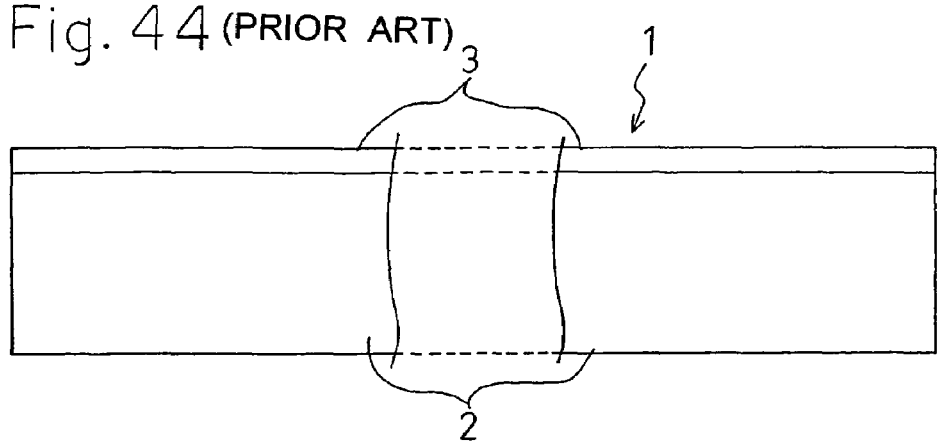
FIG. 44 is a partially omitted side view of a blade material which is straight-cut.
Figure 45:
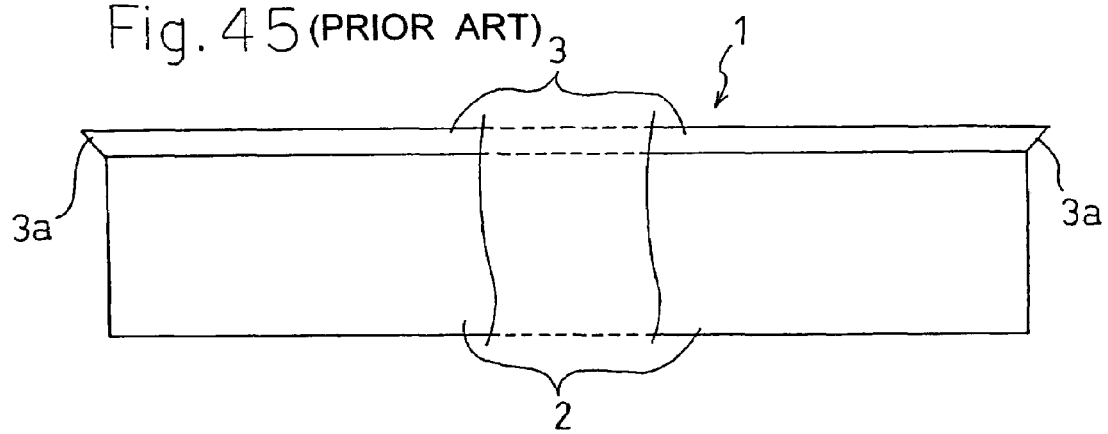
FIG. 45 is a partially omitted side view of a blade material which is miter-cut.
Figure 46:
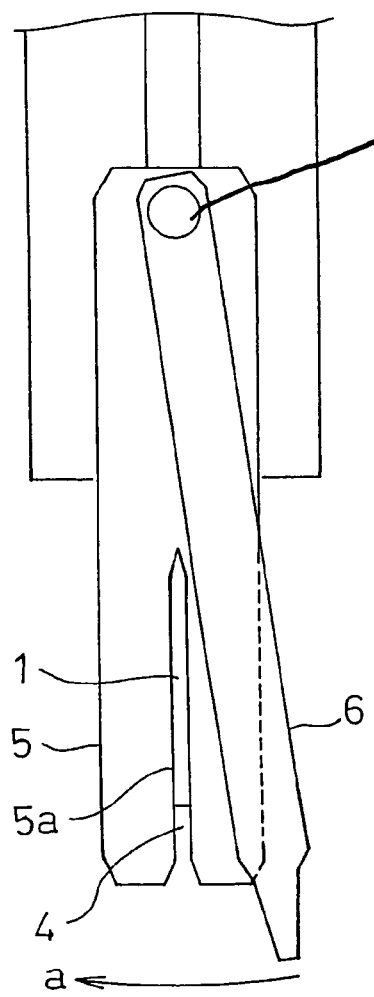
FIG. 46 is a diagrammatic front view of a conventional blade material cutting device.
Figure 47:
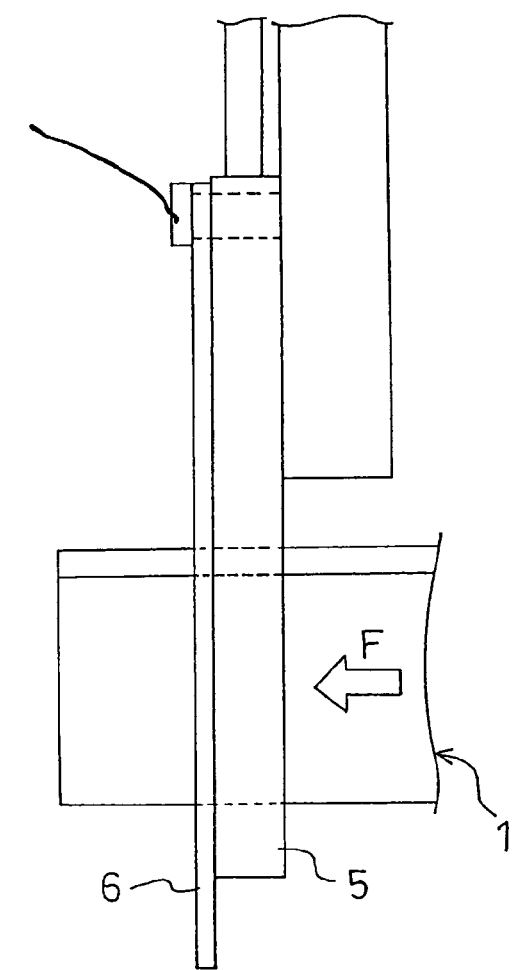
FIG. 47 is a diagrammatic side view of the conventional blade material cutting device.
Figure 48:
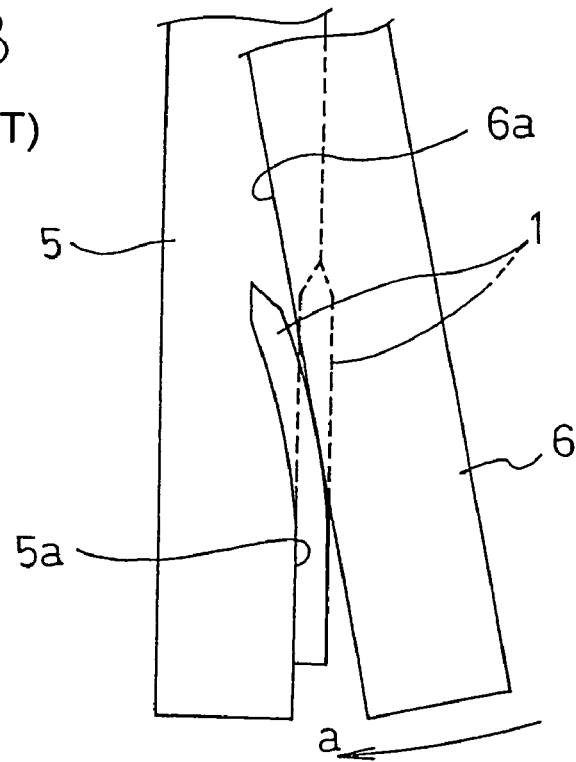
FIG. 48 is a view illustrating the principle of bending of a blade material.
Figure 49:
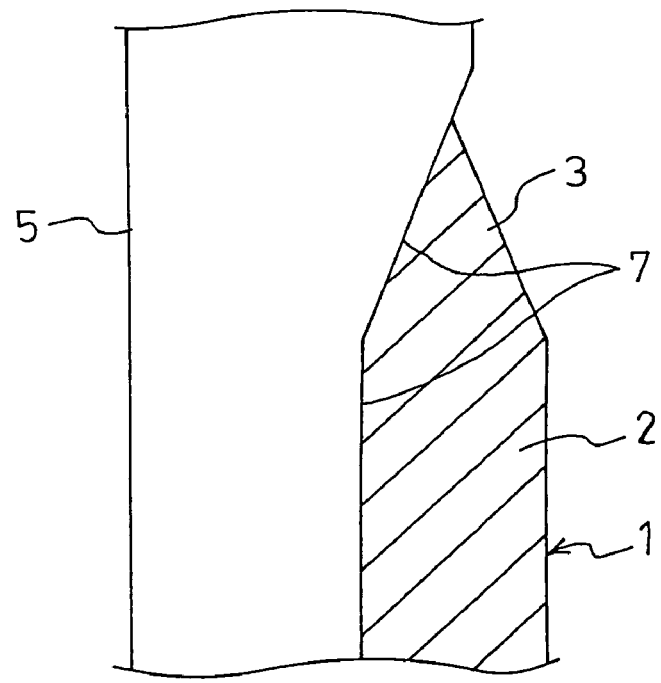
FIG. 49 is an enlarged view showing a state where a support face is overlaid on a blade material.
Figure 50A:
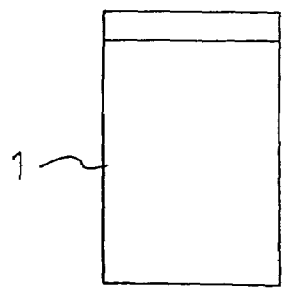
FIGS. 50A to 50D are diagrams of a problem which is caused in a conventional blade material cutting device.
Figure 50B:
Figure 50C:
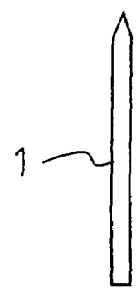
Figure 50D:
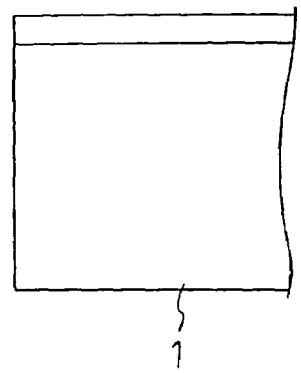
Figure 51:
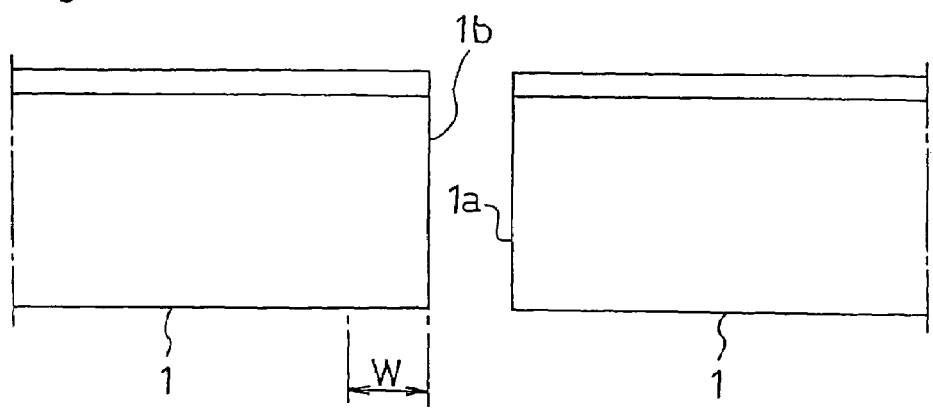
FIG. 51 is a side view illustrating states of front and rear ends of a long blade material.
Figure 52:
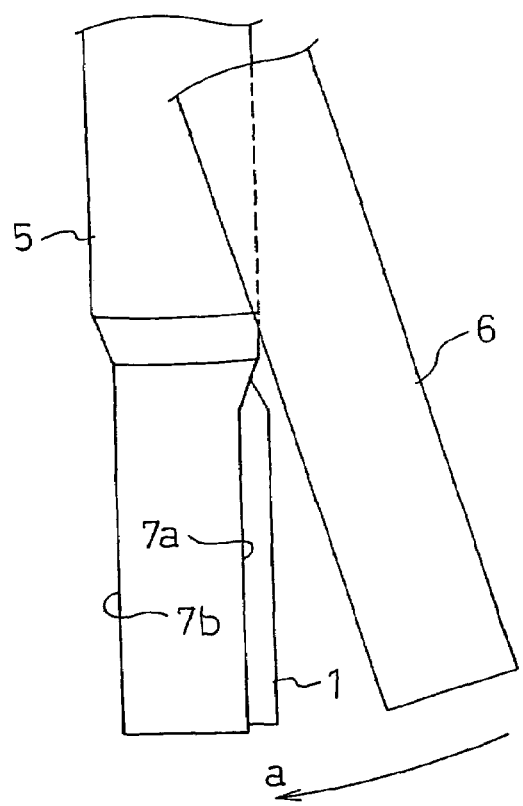
FIG. 52 is a front view illustrating the straight-cut work.
Figure 53:
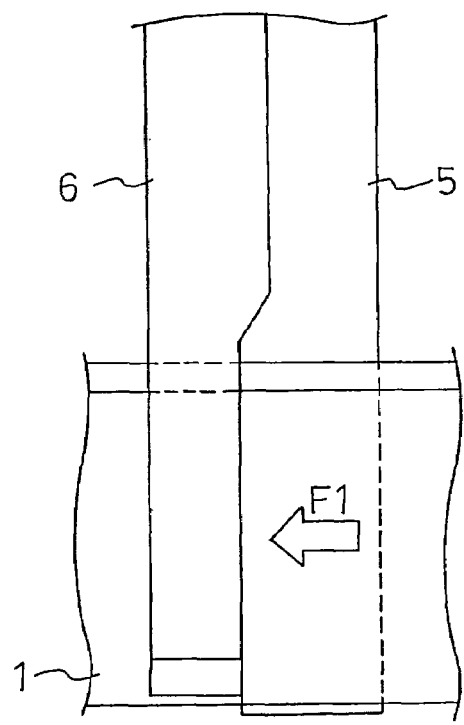
FIG. 53 is a side view illustrating the straight-cut work.
Figure 54A:
FIGS. 54A to 54D are views showing cut surface shapes of ends of blade materials which are straight-cut.
Figure 54C:
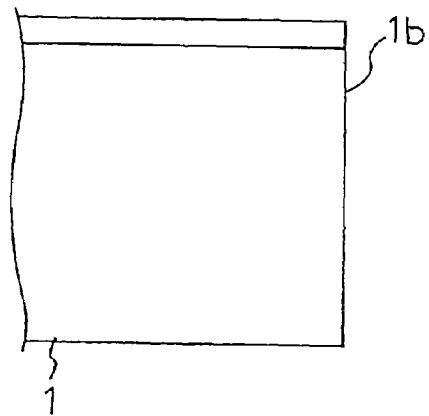
Figure 54B:
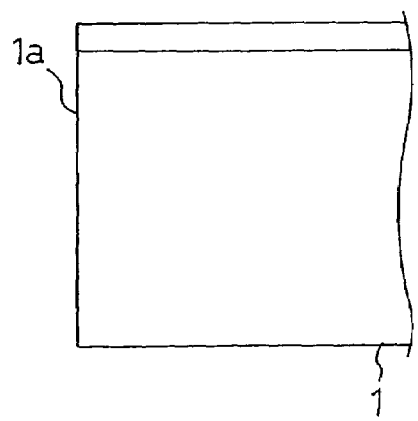
Figure 54D:
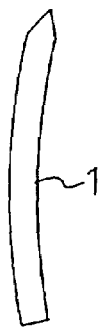
Figure 55:
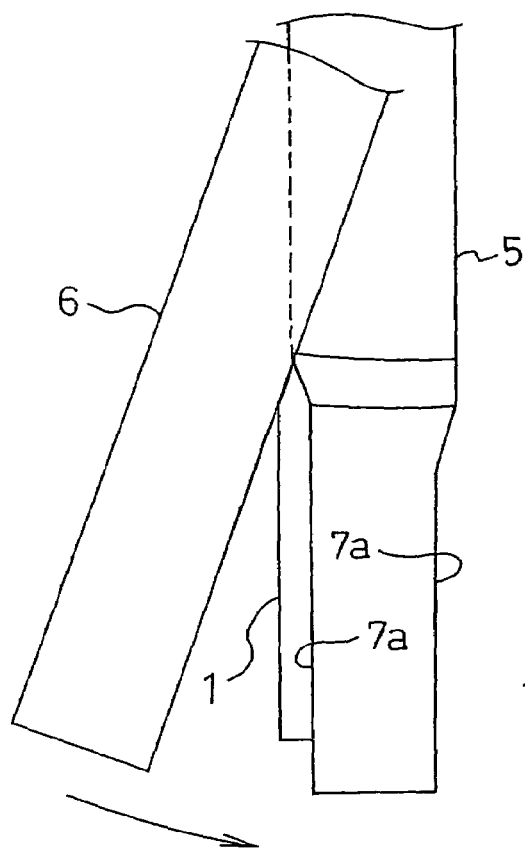
FIG. 55 is a front view illustrating the miter-cut work.
Figure 56:
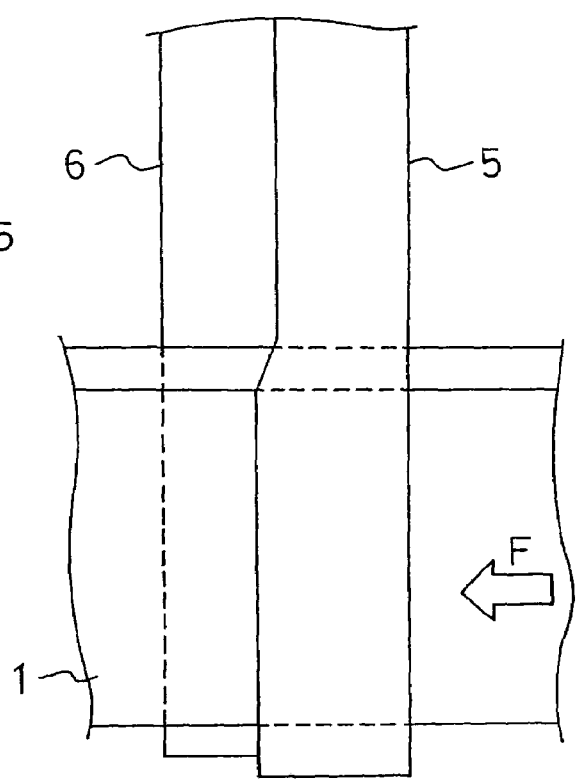
FIG. 56 is a side view illustrating the miter-cut work.
Figure 58:
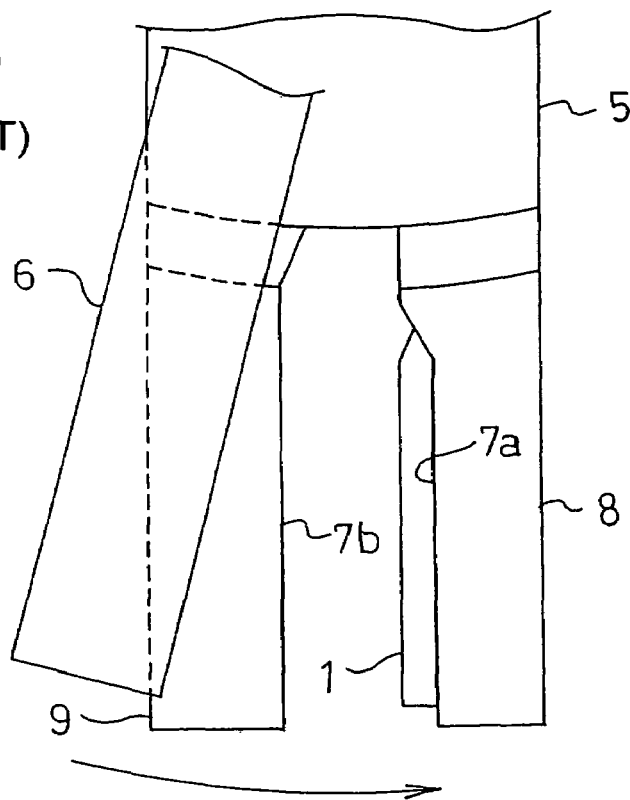
FIG. 58 is a front view illustrating the straight-cut work.
Figure 59:
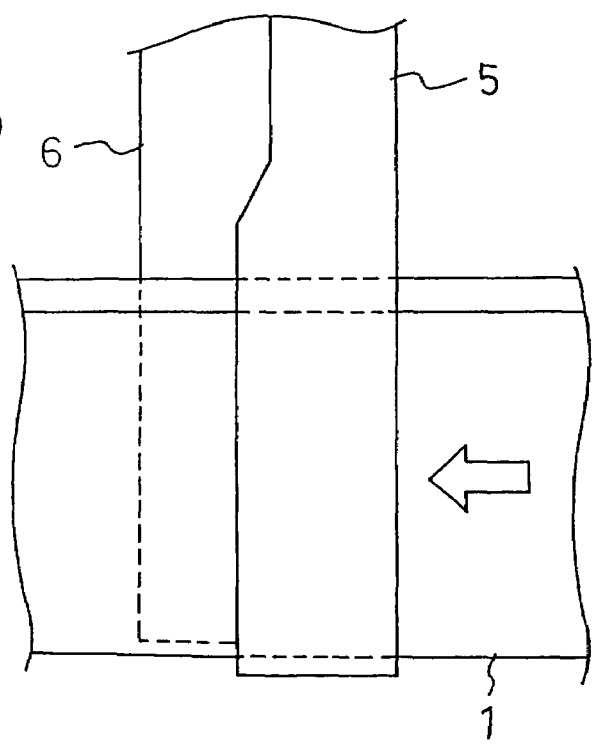
FIG. 59 is a side view illustrating the straight-cut work.
Figure 60:
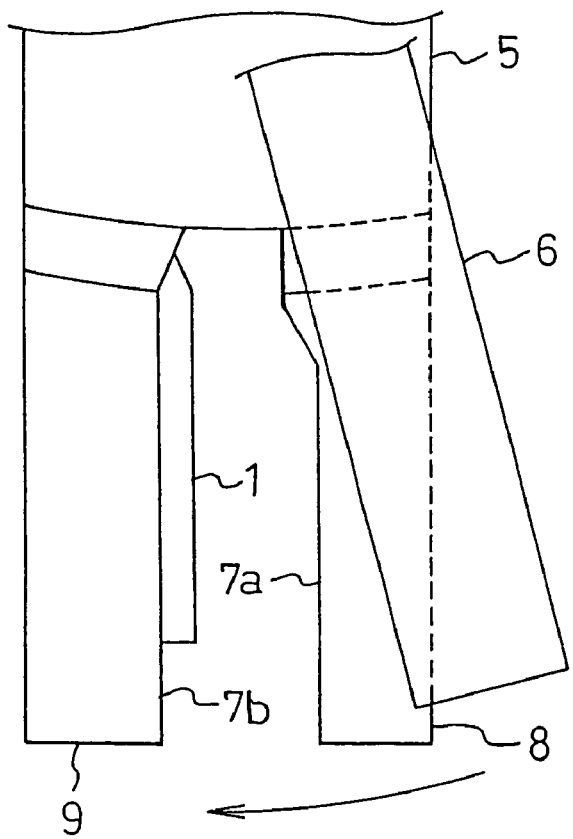
FIG. 60 is a front view illustrating the miter-cut work.
Figure 61:
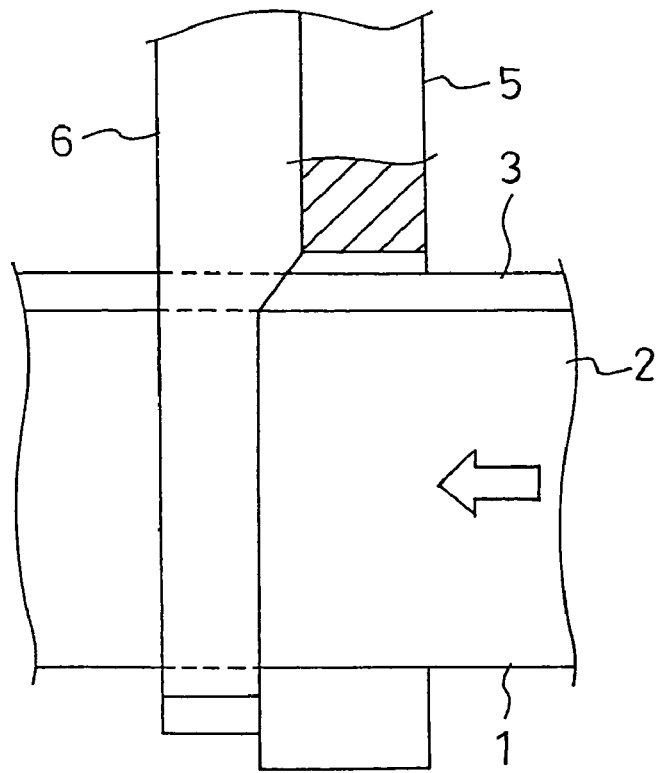
FIG. 61 is a partially cutaway side view illustrating the miter-cut work.
Figure 62:
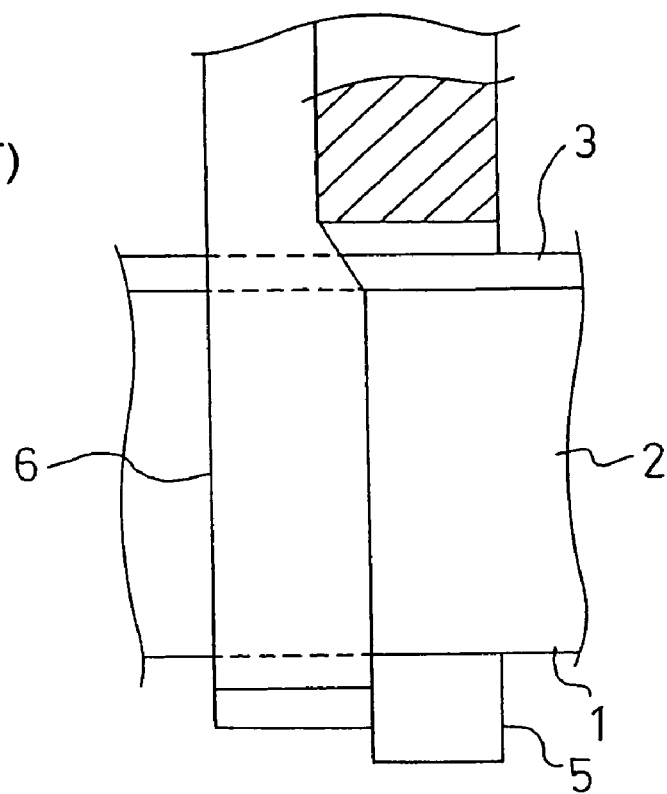
FIG. 62 is a partially cutaway side view illustrating the miter-cut work.
Figure 63:
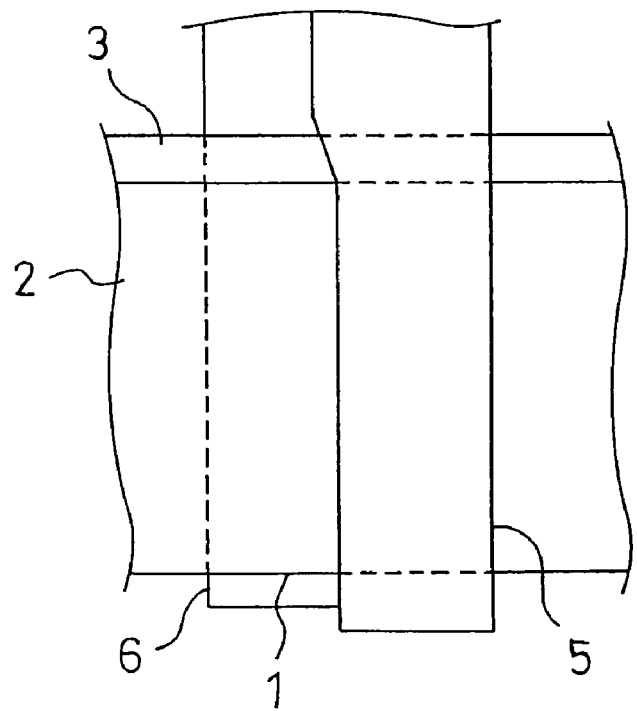
FIG. 63 is a front view illustrating the miter-cut work.

In a blade material cutting device in which a stationary blade part having two protrusions, and a front movable blade part and a rear movable blade part are combinedly used as described in the fourth embodiment, as shown in FIGS. 42 and 43, plural (in the illustrated example, two) stationary blade parts 30, 30 may be disposed integrally with a rotary member 90, and as required only one of the two stationary blade parts 30, 30 may be used with being positioned in a blade material cutting position by rotating the rotary member 90. In FIG. 42, 91 denotes a support pin which forms the rotation center, 92 denotes a positioning pin, and 93 denotes a pushing and pulling mechanism for driving the front or rear movable blade part 60.

In FIGS. 1 to 43, in order to avoid duplicate description, identical or equivalent portions are denoted by the same reference numerals.

INDUSTRIAL APPLICABILITY

As described above, according to the blade material cutting device of the invention, no bend is produced in the front and rear ends of a cut blade material. Moreover, the device can be configured so that the straight-cut work and the miter-cut work can be conducted, and both the front and rear ends of a blade material can be cut simply by conducting a single cutting operation.

The invention claimed is:

1. A blade material cutting device which is employed for cutting a strip blade material having a strip plate part and a blade edge part, wherein said device has:
   a stationary blade part having a pair of front and rear support faces on which the strip blade material is to be overlaid, and which are separated from each other by a gap in a direction of feeding said blade material;
   a pair of opposed front and rear stationary edges which are disposed in said pair of support faces;
   a movable blade part which is extracted and retracted with respect to said mutual gap between said pair of support faces; and
   a pair of front and rear movable edges which are disposed in said movable blade part, and which cooperate with said pair of stationary edges to cut away a disposal portion of said blade material that is positioned between said stationary edges, wherein:
   said pair of front and rear support faces are formed in each of right and left side faces of said stationary blade part, said pair of front and rear stationary edges which are disposed in said pair of support faces on one of said right and left side faces are straight-cutting edges for linearly forming a cut line which extends over said blade edge part and said strip plate part of said blade material after the cutting, said pair of front and rear stationary edges which are disposed in said pair of support faces on the other of said right and left side faces are miter-cutting edges for conducting a cutting operation so that said blade edge part of said blade material after the cutting has a miter shape;
   said movable blade part is placed on each side of said mutual gap;
   said pair of front and rear movable edges disposed on one side of said movable blade part cooperate with said pair of straight-cutting front and rear stationary edges to cut away a disposal portion of said blade material that is positioned between said stationary edges; and
   said pair of front and rear movable edges disposed on the other side of said movable blade part cooperate with said pair of miter-cutting front and rear stationary edges to cut away a disposal portion of said blade material that is positioned between said stationary edges.

2. A blade material cutting device which is employed for cutting a strip blade material having a strip plate part and a blade edge part, wherein said device has:
   a stationary blade part having a pair of front and rear support faces on which the strip blade material is to be overlaid, and which are separated from each other by a gap in a direction of feeding said blade material;
   a pair of opposed front and rear stationary edges which are disposed in said pair of support faces;

a movable blade part which is extracted and retracted with respect to said mutual gap between said pair of support faces; and a pair of front and rear movable edges which are disposed in said movable blade part, and which cooperate with said pair of stationary edges to cut away a disposal portion of said blade material that is positioned between said stationary edges, wherein:

said pair of front and rear support faces are formed in each of right and left side faces of said stationary blade part, said pair of front and rear stationary edges which are disposed in said pair of support faces on one of said right and left side faces are straight-cutting edges for linearly forming a cut line which extends over said blade edge part and said strip plate part of said blade material after the cutting, said pair of front and rear stationary edges which are disposed in said pair of support faces on the other of said right and left side faces are miter-cutting edges for conducting a cutting operation so that said blade edge part of said blade material after the cutting has a miter shape;

said movable blade part is configured so as to be movable between one side and another side of said mutual gap while passing through said mutual gap, said pair of front and rear movable edges, which cooperate with said pair of straight-cutting front and rear stationary edges to cut away a disposal portion of said blade material that is positioned between said stationary edges, are disposed on one of said right and left side faces of said movable blade part; and said pair of front and rear movable edges, which cooperate with said pair of miter-cutting front and rear stationary edges to cut away a disposal portion of said blade material that is positioned between said stationary edges, is disposed on the other of said right and left side faces of said movable blade part.

* * * * *